United States Patent
Zhang et al.

(10) Patent No.: US 11,825,486 B2
(45) Date of Patent: Nov. 21, 2023

(54) SEMI-PERSISTENT CONFIGURATION OF SPS/CG PARAMETER

(71) Applicant: QUALCOMM Incorporated, San Diego, CA (US)

(72) Inventors: Qian Zhang, Basking Ridge, NJ (US); Yan Zhou, San Diego, CA (US); Navid Abedini, Basking Ridge, NJ (US); Junyi Li, Franklin Park, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 308 days.

(21) Appl. No.: 17/230,260

(22) Filed: Apr. 14, 2021

(65) Prior Publication Data
US 2022/0338239 A1    Oct. 20, 2022

(51) Int. Cl.
*H04W 72/23* (2023.01)
*H04L 5/14* (2006.01)
*H04L 25/02* (2006.01)
*H04W 72/50* (2023.01)

(52) U.S. Cl.
CPC ............... *H04W 72/23* (2023.01); *H04L 5/14* (2013.01); *H04L 25/0226* (2013.01); *H04W 72/535* (2023.01)

(58) Field of Classification Search
CPC . H04L 5/0048; H04L 5/16; H04L 5/14; H04L 5/0023; H04L 25/0226
USPC .................. 370/328, 329, 330, 331
See application file for complete search history.

(56) References Cited

U.S. PATENT DOCUMENTS

| | | | | |
|---|---|---|---|---|
| 10,834,743 | B2* | 11/2020 | Dinan | H04L 1/1896 |
| 2015/0333896 | A1* | 11/2015 | Damnjanovic | H04W 74/0808 370/277 |
| 2016/0028533 | A1* | 1/2016 | Kazmi | H04W 56/0045 370/296 |
| 2017/0202008 | A1* | 7/2017 | Nader | H04W 72/12 |
| 2018/0049224 | A1* | 2/2018 | Dinan | H04W 4/70 |
| 2018/0295651 | A1* | 10/2018 | Cao | H04W 74/0833 |
| 2020/0015206 | A1* | 1/2020 | Lee | H04L 5/0053 |

(Continued)

FOREIGN PATENT DOCUMENTS

| | | |
|---|---|---|
| EP | 3927068 A1 | 12/2021 |
| WO | 2020213877 A1 | 10/2020 |

OTHER PUBLICATIONS

International Search Report and Written Opinion—PCT/US2022/022033—ISA/EPO—dated Jul. 4, 2022.

*Primary Examiner* — David Q Nguyen
(74) *Attorney, Agent, or Firm* — Procopio, Cory, Hargreaves & Savitch LLP

(57) ABSTRACT

A UE may receive, from a base station, a first signal of first configuration parameters for an FD mode and second configuration parameters for an HD mode, the first configuration parameters and the second configuration parameters being associated with at least one of SPS occasions or CG occasions. The base station and the UE may communicate with each other via at least one of the SPS occasions or the CG occasions. The first signal may be transmitted via at least one of RRC signaling or DCI. The base station may transmit an indication to apply the first configuration parameters or the second configuration parameters or may transmit a second signal to update the configuration parameters for the FD mode or the HD mode.

30 Claims, 12 Drawing Sheets

(56) References Cited

U.S. PATENT DOCUMENTS

2021/0037516 A1    2/2021   Lyu et al.
2022/0110137 A1*   4/2022   Bai ......................... H04L 5/14

* cited by examiner

SEMI-PERSISTENT CONFIGURATION OF SPS/CG PARAMETER

BACKGROUND

Technical Field

The present disclosure relates generally to communication systems, and more particularly, to a method of wireless communication including one or more parameters for semi-persistent scheduling (SPS) or configured grant (CG) (SPS/CG) occasions in a duplex mode.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may include a base station and a user equipment (UE). The base station may transmit, to the UE, one or more sets of configurations parameters for the full duplex (FD) mode and the half duplex (HD) mode, and the base station and the UE may communicate via at least one of one or more semi-persistent scheduling (SPS) occasions or one or more configured grant (CG) occasions based on the one or more sets of configurations parameters for FD mode and HD mode.

The base station may determine one or more first configuration parameters for FD mode and one or more second configuration parameters for HD mode, the one or more first configuration parameters and the one or more second configuration parameters being associated with at least one of one or more SPS occasions or one or more CG occasions, transmit, to the UE, a first signal of the one or more first configuration parameters and the one or more second configuration parameters. The base station and the UE may communicate with each other via at least one of the one or more SPS occasions or the one or more CG occasions based on at least one of the one or more first configuration parameters or the one or more second configuration parameters.

The one or more first configuration parameters may be associated with a first subset of one or more SPS configurations or one or more SPS occasions within an SRS configuration or associated with a first subset of one or more CG configurations or one or more CG occasions within a CG configuration, and the one or more second configuration parameters may be associated with a second subset of one or more SPS configurations or one or more SPS occasions within an SRS configuration or associated with a second subset of one or more CG configurations or one or more CG occasions within a CG configuration. The one or more first configuration parameters may include at least one of at least one downlink (DL) and uplink (UL) beam pair for FD mode, one or more power control parameters, a transmission (Tx) power, or a modulation and coding scheme (MCS), and the one or more second configuration parameters may include at least one of at least one DL or UL beam for HD mode, one or more power control parameters, a Tx power, or an MCS.

In one aspect, the UE may apply at least one of the one or more first configuration parameters or the one or more second configuration parameters based on activation or release of at least one of the one or more SPS occasions or the one or more CG occasions. In another aspect, the UE may receive, from the base station, an indication to apply the one or more first configuration parameters and the one or more second configuration parameters, the indication corresponding to activation or release of at least one of the one or more SPS occasions or the one or more CG occasions.

The base station may transmit, to the UE, a second signal to change parameters to at least one of one or more third configuration parameters for FD mode or one or more fourth configuration parameters for HD mode, and the base station and the UE may communicate with each other via at least one of the one or more SPS occasions or the one or more CG occasions based on at least one of the one or more third configuration parameters or the one or more fourth configuration parameters.

In one aspect, the second signal may include a time window to communicate with the UE based on at least one of the one or more third configuration parameters or the one or more fourth configuration parameters. In another aspect, the second signal may include a bitmap indicating at least one of the one or more SPS occasions or the one or more CG occasions to apply at least one of the one or more third configuration parameters or the one or more fourth configuration parameters in communicating with the UE. In another aspect, the one or more third configuration parameters or the one or more fourth configuration parameters may be applied for retransmissions of the one or more SPS occasions or the one or more CG occasions, based on per occasion repetition of the one or more SPS occasions or the one or more CG occasions. In yet another aspect, the second signal may include a configurable parameter indicating at least one frequency offset between a downlink transmission and an uplink transmission for FD mode.

The first signal, the second signal, and the indication to change parameters may be transmitted via at least one of radio resource control (RRC) signaling or downlink control information (DCI).

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
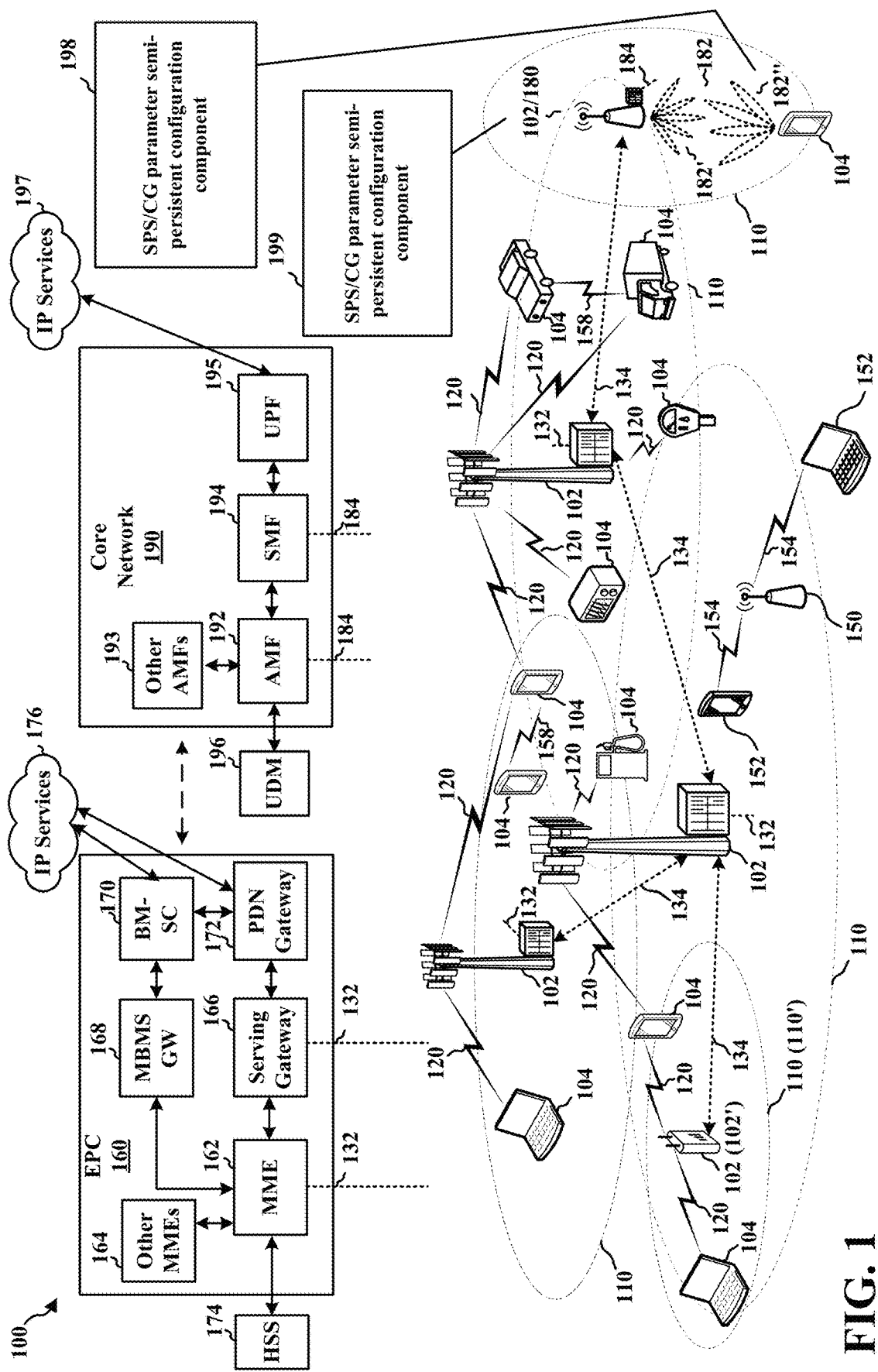
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field-programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer-executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspects. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25

GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include an SPS/CG parameter semi-persistent configuration component 198 configured to receive, from a base station, a first signal of one or more first configuration parameters for an FD mode and one or more second configuration parameters for an HD mode, the one or more first configuration parameters and the one or more second configuration parameters being associated with at least one of one or more SPS occasions or one or more CG occasions, and communicate, with the base station via at least one of the one or more SPS occasions or the one or more CG occasions, based on at least one of the one or more first configuration parameters or the one or more second configuration parameters. In certain aspects, the base station 180 may include an SPS/CG parameter semi-persistent configuration component 199 configured to determine one or more first configuration parameters for FD mode and one or more second configuration parameters for HD mode, the one or more first configuration parameters and the one or more second configuration parameters being associated with at least one of one or more SPS occasions or one or more CG occasions, transmit, to at least one UE, a first signal of the one or more first configuration parameters and the one or more second configuration parameters, and communicate, with the at least one UE via at least one of the one or more SPS occasions or the one or more CG occasions, based on at least one of the one or more first configuration parameters or the one or more second configuration parameters. Although the following description may be focused on 5G NR, the concepts described herein may be applicable to other similar areas, such as LTE, LTE-A, CDMA, GSM, and other wireless technologies.

Figure 2:
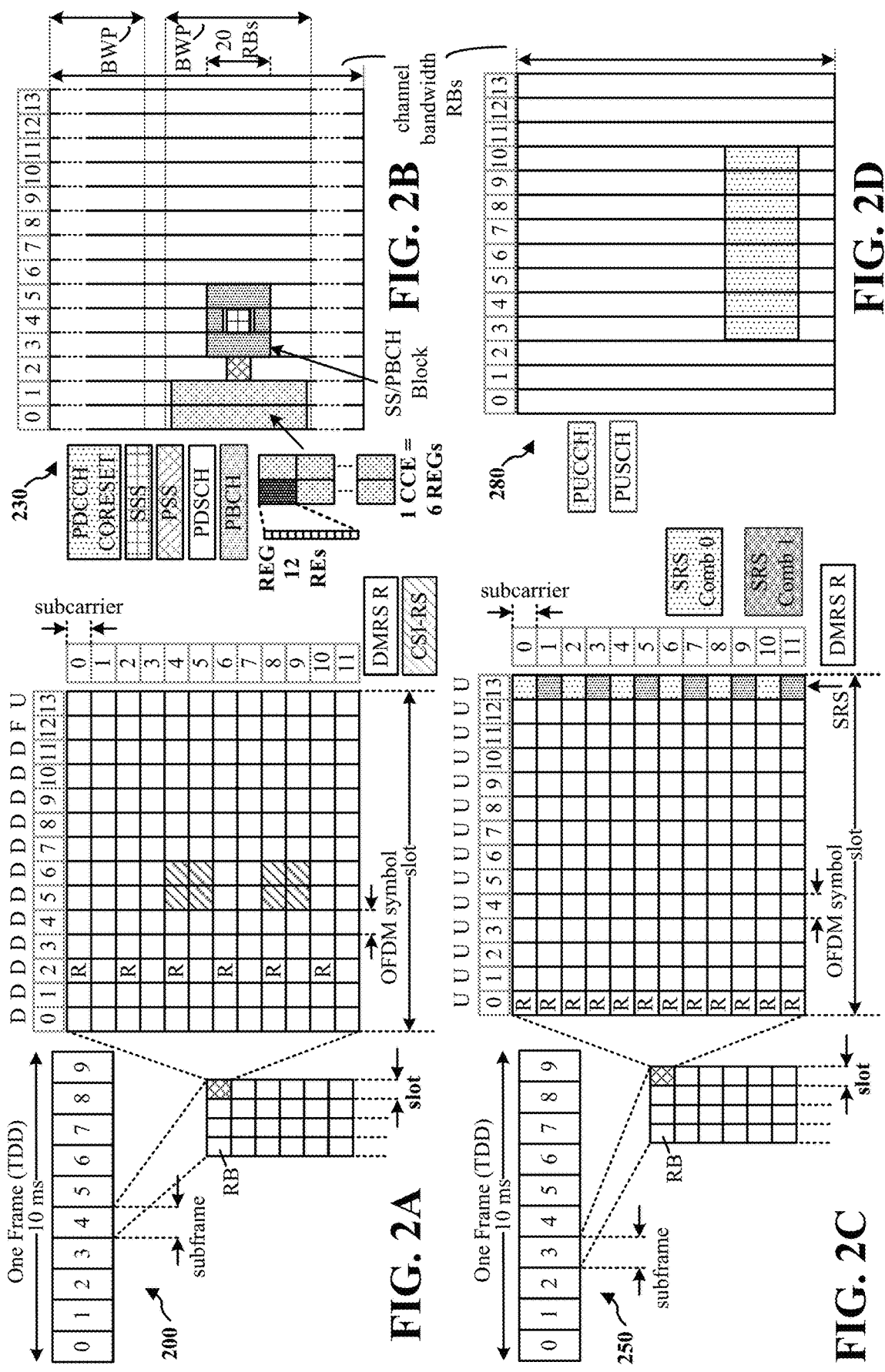
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
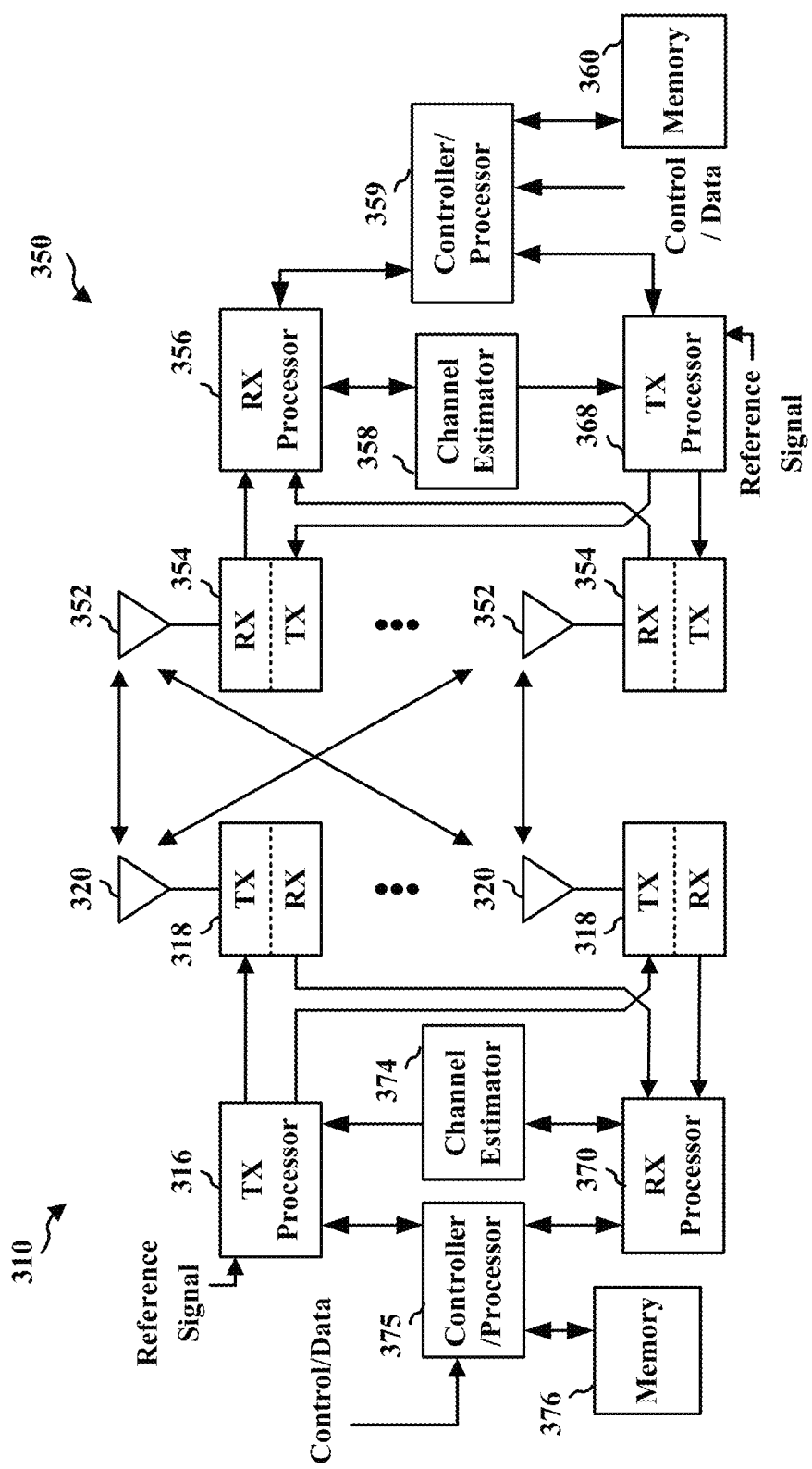
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1. At least one of the TX processor 316, the RX processor 370, and the controller/processor 375 may be configured to perform aspects in connection with 199 of FIG. 1.

In some aspects, at least one base station and one or more UE may support various duplex modes of communications, including a full duplex (FD) mode and a half duplex (HD) mode. FD mode may refer to simultaneous communications of one or more uplink (UL) transmissions or one or more downlink (DL) communications at a network entity, e.g., a base station or a UE, that may be associated with various aspects of procedures within the same frequency, different frequency subbands, or partially overlap in the frequency domain. HD mode may support transmission or reception of information in one direction at a time without overlapping uplink and downlink communication.

In FD mode, at least one base station and one or more UEs may simultaneously transmit and receive UL/DL communications. In one example, a base station in FD mode and a UE in FD mode may simultaneously transmit and receive UL/DL communications. That is, the base station may send a DL transmission to the UE simultaneously with the UE sending an UL transmission to the base station. In another example, a base station in FD mode may simultaneously transmit and receive UL/DL communications to and from two UEs. That is, the base station may send a DL transmission to a first UE simultaneously with receiving an UL transmission from a second UE. In yet another example, a UE in FD mode may receive a DL transmission from a first base station simultaneously with sending an UL transmission to a second base station. That is, the UE in FD mode may receive a DL transmission from a first base simultaneously with sending an UL transmission to a second base station. In some aspects, the base station may be a TRP or an integrated access and backhaul (IAB) node of an IAB network.

An IAB network may include at least one IAB donor, i.e., an anchor node, and one or more IAB nodes, and the IAB nodes may exchange communication with other IAB nodes, with a base station, and/or with one or more UEs. The IAB donor may be connected to the core network via a wireline backhaul link, and the IAB nodes may be connected to the IAB donor via backhaul links. One or more UEs may be connected to the IAB donor or one or more IAB nodes via respective access links.

In one aspect, one or more IAB nodes may simultaneously communicate with each other. That is, one IAB node may simultaneously communicate the transmission and reception of data with another IAB node. One IAB node may also simultaneously communicate transmission and/or reception of data with a first IAB node and communicate transmission and/or reception of data with a second IAB node. In another aspect, one or more IAB nodes and one or more UEs may communicate UL transmission and DL transmission. For example, one IAB node may simultaneously communicate UL transmission and DL transmission with one UE. In another example, one IAB node may simultaneously communicate an UL transmission with a first UE and a DL transmission with a second UE. In yet another example, a first IAB node may communicate an UL transmission with a UE simultaneously with a second IAB node communicating a DL transmission with the UE.

The FD capability may be present at the base station or the UEs. That is, at least one of the base station or the UE may have the capability to support FD mode communication. For example, a UE may have multiple panels facing different directions, e.g., two antennas facing the front and two antennas facing the back of the UE, and the front-facing antenna panels may be configured to transmit/receive beams different from the beams transmitted/received via the rear-facing antenna panels. Accordingly, the UE may have the capability to support UL transmission from one antenna panel and DL reception in another antenna panel simultaneously. For another example, a base station may have the capability to support UL reception through forming a first beam at a first set of antenna panels and support DL transmission through forming a second beam at a second set of antenna panels simultaneously.

In some aspects, the FD capability of a network entity, e.g., the one or more UEs or base stations, may be conditional on various factors, such as interference, beam separation, antenna separation, isolation, etc. In one aspect, the network entity may support FD mode communication based on whether the network entity has a capability to perform beam separation. That is, the network entity may determine that the network entity may support FD mode communication based on the capability of the network entity to separate the UL beam and the DL beam. In another aspect, the network entity may support FD mode communication based on self-interference between the DL and/or UL transmissions. That is, the self-interference caused by the simultaneous transmission of the DL/UL signals may impede the network entity's capacity to support FD mode communication. In yet another aspect, a clutter echo caused by reflections of the radio signals at surfaces or obstructions may affect the network entity's capacity to support FD mode communication.

FD mode communication may reduce the network latency. In one aspect, the network entity, e.g., the one or more UEs or base stations, may receive a DL signal in UL-only slots without waiting until the end of the UL-only slots, and the network latency may be reduced. Also, the network entity in FD mode may communicate more information, and a spectrum efficiency, which refers to the information rate that can be transmitted over a given spectrum or bandwidth, may be enhanced per cell and/or per UE, and improve the efficiency of the resource utilization.

Figure 4A:
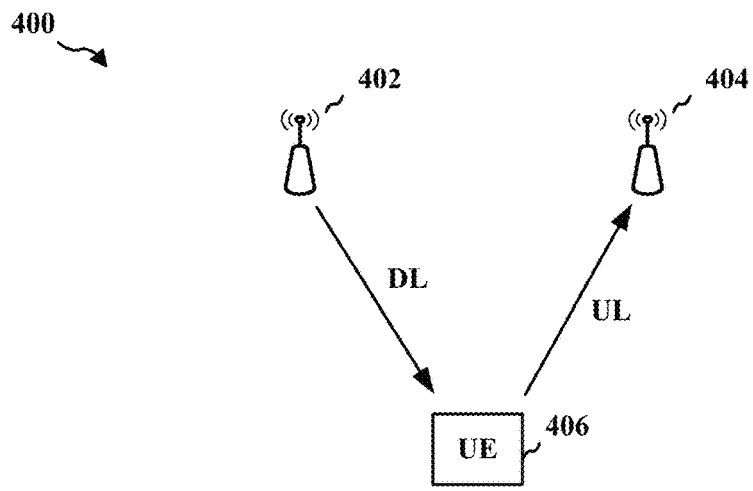
FIGS. 4A, 4B, and 4C are examples of the duplex mode of wireless communication.
Figure 4B:
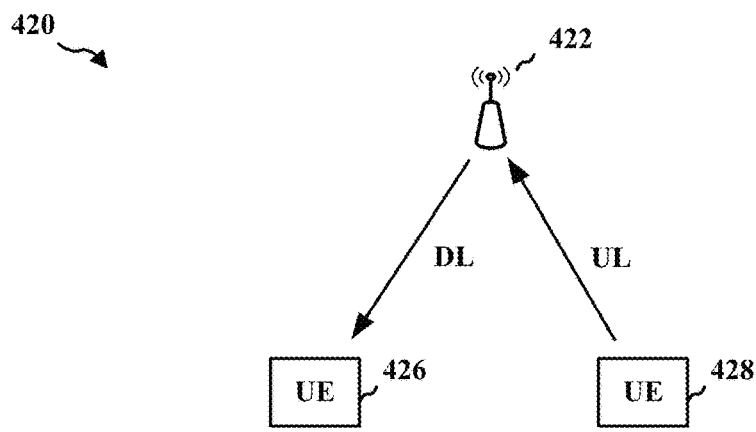
Figure 4C:
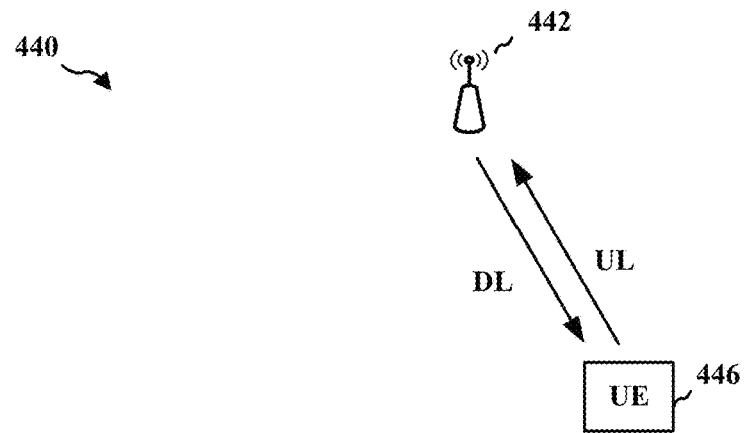

FIGS. 4A, 4B, and 4C are examples 400, 420, and 440 of different types of FD mode of wireless communications. The first example 400 may include a first base station 402 and a second base station 404, and a UE 406 in FD mode. In one aspect, the UE 406 may support FD mode while the first base station 402 and the second base station 404 may not support FD mode. The UE 406 may have the FD capability to simultaneously communicate UL/DL transmissions with the first base station 402 and the second base station 404. For example, the UE 406 may receive the DL transmission from the first base station 402 and transmit an UL transmission to the second base station 404 simultaneously. The UE 406 may receive the DL transmission from the first base station 402 via a first antenna panel and send the UL transmissions to the second base station 404 via a second antenna panel. Here, the first base station 402 may be a first TRP 402, and the second base station 404 may be a second TRP 404.

The second example 420 may include a base station 422 in FD mode, and a first UE 426 and a second UE 428. In one aspect, the base station 422 in FD mode may simultaneously communicate UL/DL transmissions with the first UE 426 and the second UE 428. In one aspect, the base station 422 may support FD mode, and the first UE 426 and the second UE 428 may not support FD mode. For example, the base station 422 may transmit a DL transmission to the first UE 426 and receive an UL transmission from the second UE 428 simultaneously. The base station 422 may transmit the DL transmission to the first UE 426 via a DL beam and receive the UL transmissions from the second UE 428 via an UL beam.

The third example 440 may include a base station 442 in FD mode and a UE 446 in FD mode. In one aspect, the base station 442 in FD mode may simultaneously communicate UL/DL transmissions with the UE 446. In one aspect, the base station 442 and the UE 446 may support FD mode. For example, the base station 442 may transmit a DL transmission to the UE 446 and receive an UL transmission from the UE 446 simultaneously. For example, the base station 442 may transmit the DL transmission to the UE 446 via a DL beam and receive the UL transmissions from the UE 446 via an UL beam.

Figure 5:
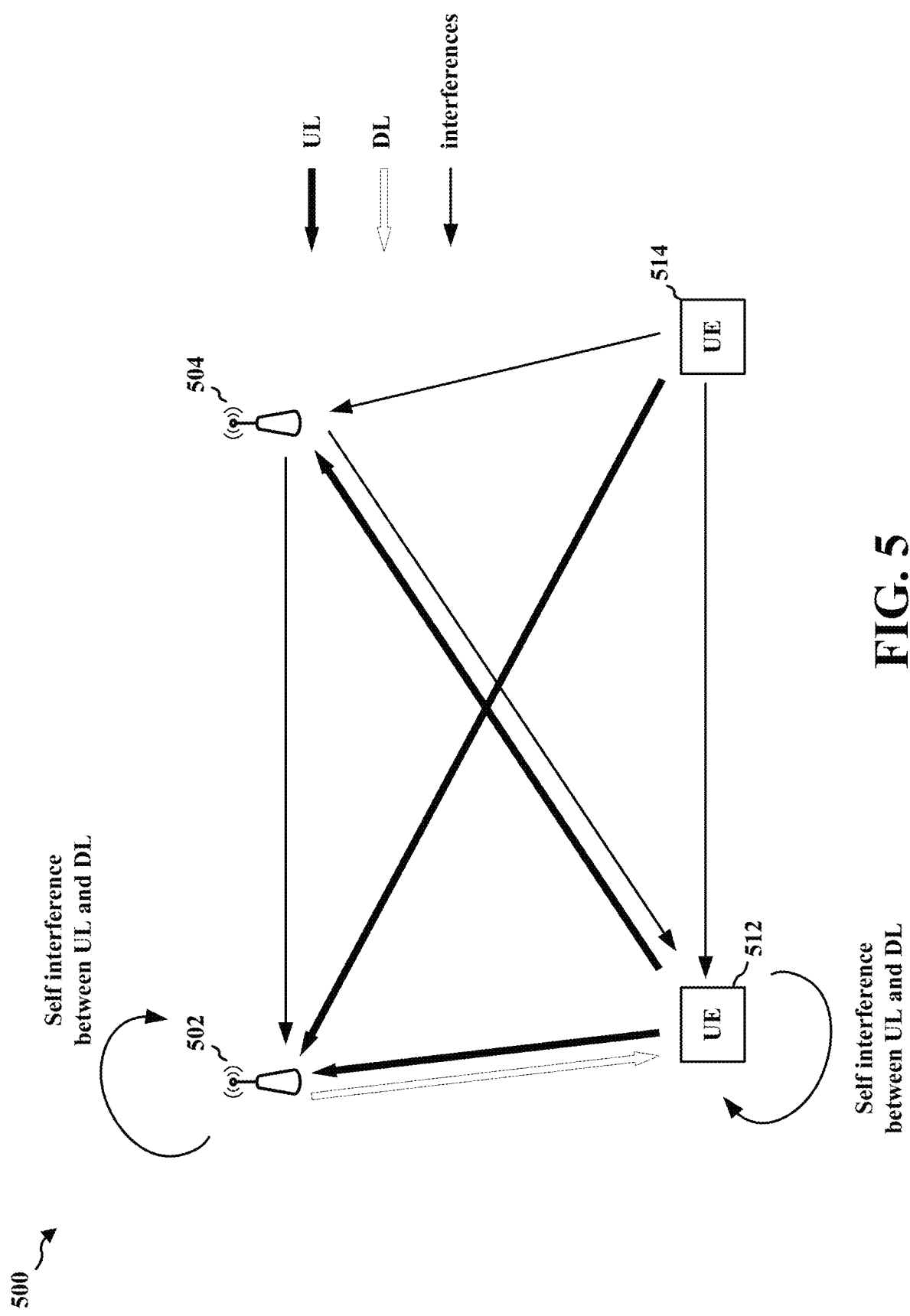
FIG. 5 illustrates examples of interference in the duplex mode of wireless communication.

FIG. 5 illustrates an example 500 of interference in different aspects of FD mode of wireless communication. FIG. 5 includes a first base station 502, a second base station 504, a first UE 512, and a second UE 514. Here, the first base station 502 and the second base station 504 may be a first TRP 502 and a second TRP 504.

In some aspects, the first base station 502 and the first UE 512 may operate in FD mode. The first base station 502 and the first UE 512 operating in FD mode may suffer various types of interference based on the duplex mode and the data transmissions from the second base station 504 and the second UE 514. In one example, the first base station 502 operating in FD mode may experience a self-interference from the UL and DL signals at the first base station 502 and the interference from the signal transmitted by the second UE 514. In another example, the first UE 512 operating in FD mode may experience a self-interference from the UL and DL signals at the first UE 512, the interference from the signal transmitted by the second base station 504, and the interference from the signal transmitted by the second UE 514.

In one aspect, the first base station 502 and the second base station 504 may operate in HD mode, and the first UE 512 may operate in FD mode. For example, the first base station 502 and the second base station 504 in HD mode and the first UE 512 in FD mode may correspond with the first example 400 illustrated in FIG. 4A, including the first base station 402 and the second base station 404 in HD mode and the UE 406 in FD mode. Here, the first base station 502 may be a first TRP 502, and the second base station 504 may be a second TRP 504.

The first UE 512 operating in FD mode may receive the DL signal from the first base station 502 and transmit the UL signal to the second base station 504. The first UE 512 in FD mode may experience a self-interference, in which a signal transmitted from the first UE 512 may affect a receiver at the first UE 512 and a signal received at the first UE 512 may affect the transmitter at the first UE 512. That is, the DL signal received from the first base station 502 and the UL signal transmitted to the second base station 504 may cause the self-interference to the DL signal received from the first base station 502 and the UL signal transmitted to the second base station 504 for the first UE 512. The first UE 512 may also experience interference from a signal transmitted by the second base station 504 and/or a signal transmitted by the second UE 514.

In another aspect, the first base station 502 may operate in FD mode, and the first UE 512 and the second UE 514 may operate in HD mode. For example, the first base station 502 in FD mode and the first UE 512 and the second UE 514 in HD mode may correspond with the second example 420 illustrated in FIG. 4B, including the base station 422 in FD mode and the first UE 426 and the second UE 428 in HD mode.

The first base station 502 operating in FD mode may transmit the DL signal to the first UE 512 and receive the UL signal from the second UE 514. The first base station 502 in FD mode may experience a self-interference, in which a signal transmitted from the first base station 502 may affect a receiver at the first base station 502 and a signal received at the first base station 502 may affect a transmitter at the first base station 502. That is, the DL signal transmitted to the first UE 512 and the UL signal received from the second UE 514 may cause the self-interference to the DL signal transmitted to the first UE 512 and the UL signal received from the second UE 514 for the first base station 502. The first base station 502 may also experience interference from a signal transmitted by the second base station 504.

In another aspect, the first base station 502 may operate in FD mode, and the first UE 512 may operate in FD mode. For example, the first base station 502 and the first UE 512 in FD mode may correspond with the third example 440 illustrated in FIG. 4C, including the base station 442 in FD mode and the UE 446 in FD mode.

The first base station 502 operating in FD mode may transmit the DL signal to the first UE 512 and receive an UL signal from the first UE 512. The first base station 502 in FD mode may experience self-interference. That is, the DL signal transmitted to the first UE 512 and the UL signal received from the first UE 512 may cause the self-interference to the DL signal transmitted to the first UE 512 and the UL signal received from the first UE 512 for the first base station 502. The first base station 502 may also experience interference from a signal transmitted by the first base station 502.

The base station may schedule resource allocation for the UEs for transmitting the UL transmission to the base station and/or receiving the DL transmission from the base station. In one aspect, the base station may configure semi-persistent scheduling (SPS) for the UE and schedule resource allocation to receive the DL transmission from the base station. An SPS occasion may refer to SPS-based resource allocation for DL communications, which may allocate at least a part of resources for the UE to semi-statically receive the DL signals over a certain time interval. The base station may initially configure the parameters for the SPS occasion by the RRC message and then further configure the SPS via the DCI carried in the PDCCH. For example, the base station may indicate in the RRC message an initial configuration of the parameters of the SPS occasion, including a periodicity of the DL transmissions, and indicate, in the DCI, further configurations of the parameters of the SPS occasions, including parameters for beam, MCS, resource allocation, etc. The base station may further activate or release the SPS occasions via the DCI.

In another aspect, the base station may configure a configured grant (CG) for the UE and schedule a resource allocation to transmit the UL transmissions to the base station without a dynamic grant (DG). A CG occasion may refer to CG-based resource allocation for UL communications, which may grant at least a part of resources for the UE to semi-statically transmit the UL signals over a certain time interval. The CG may have two types: a CG type 1 and a CG type 2. The CG type 1 may refer to an UL grant that is configured and activated or released by RRC messages. That is, the base station may configure the CG type 1 for the UE via the RRC message to transmit UL transmissions and activate or release the configured CG occasions via the RRC message for the UE to send the UL transmissions.

The CG type 2 may refer to the base station initially configuring the CG by the RRC message and then further configuring the CG via the DCI carried in the PDCCH. For example, the base station may indicate in the RRC message an initial configuration of the CG occasions for the UE, including a periodicity of the UL transmissions, and indicate, in the DCI, further configurations of the CG occasion including parameters for beams, MCS, resource allocation, etc. The base station may further activate or release the CG via the DCI.

The wireless network may determine and instruct the network entities, including the one or more base stations, e.g., the first base station 502 and the second base station 504, and the at least one UE, e.g., the first UE 512 and the second UE 514, with proper configuration parameters for the SPS/CG occasions in HD mode or FD mode operation based on the various factors on which FD mode may be conditional. That is, based on various factors for the SPS/CG occasions, including interference, beam separation, antenna separation, isolation, etc., the network may determine the configuration parameters for the network entities to operate in HD mode and/or FD mode operation. For example, the configuration parameters may include various parameters for the SPS/CG occasions of sending and/or receiving UL/DL signals in HD mode and/or FD mode, including, but not limited to, beam/beam pair, power control parameters, Tx powers, MCSs, etc.

In some aspects, the wireless network, including the base station, may configure different sets of configuration parameters for the SPS/CG occasions in HD mode and FD mode. That is, the wireless network may configure a set of first configuration parameters for FD mode and a set of second configuration parameters for HD mode. The configuration parameters of each set of configuration parameters may include different parameters for HD mode operation or FD mode operation, which may include multiple sets of parameters, including various beam/beam pair, power control parameters, Tx powers, MCSs, etc.

In one aspect, two different sets of configuration parameters may be signaled to the UE via at least one of the RRC message or the DCI carried on the PDCCH. That is, the base station may determine the set of first configuration parameters for FD mode and the set of second configuration parameters for HD mode and transmit the set of first configuration parameters for FD mode and the set of second configuration parameters for HD mode to the UE via at least one of the RRC message or the DCI. In one aspect, the UE may determine which set of parameters to use based on the scheduling information of the SPS/CG occasions, and the base station may not indicate the UE to use which set of parameters for FD mode or HD mode. For example, the base station may transmit the set of first configuration parameters for FD mode and the set of second configuration parameters for FD mode to the UE configured to operate in FD mode, and the UE may decide to use one of the set of first configuration parameters for FD mode or the set of second configuration parameters for FD mode based on whether the SPS/CG occasions overlap with each other. That is, the UE may determine that the UL transmission based on the CG, i.e., CG occasion, overlap with the DL transmission based on the SPS, i.e., SPS occasion, the UE may decide to apply the first configuration parameters for FD mode to the overlapping SPS/CG occasions. The UE may also determine that the CG occasion does not overlap with the SPS occasion, and the UE may decide to apply the second configuration parameters for HD mode to the non-overlapping SPS/CG occasions.

In another aspect, two different sets of configuration parameters may be signaled to the UE, and the base station may indicate which SPS/CG occasions are associated with the set of first configuration parameters for FD mode and which SPS/CG occasions are associated with the set of second configuration parameters for HD mode. That is, the base station may determine the set of first configuration parameters for FD mode and the set of second configuration parameters for FD mode, and transmit the set of first configuration parameters for FD mode and the set of second configuration parameters for FD mode to the UE via at least one of the RRC message or the DCI. The base station may further indicate the SPS/CG occasions associated with the set of first configuration parameters for FD mode and the SPS/CG occasions associated with the set of second configuration parameters for HD mode. For example, the base station in FD mode may be connected to a first UE operating in HD mode and a second UE operating in HD mode, and each of the first UE and the second UE may communicate with the base station via a single direction Tx or Rx. The base station may indicate to the first UE in HD mode and the second UE in HD mode which set of configuration parameters may be applied or associated with which SPS/CG occasion.

In some aspects, after configuring and activating the SPS/CG occasions and configuring the sets of configuration parameters to apply to the SPS/CG occasions in HD mode and/or FD mode, the network may determine that the various factors of the wireless network considered for the configuration of FD mode and HD mode may change. Accordingly, the network may instruct the UE to change the sets of parameters for the SPS/CG occasions in HD mode and/or FD mode.

The network including the base station may, after configuring and activating the SPS/CG occasions and configuring the sets of configuration parameters for the SPS/CG occasions in HD mode and/or FD mode, indicate a change to the sets of configuration parameters if the network determines to change the sets of configuration parameters for HD mode and/or FD mode. That is, the base station may initially configure the set of first configuration parameters for the SPS/CG occasions in FD mode and the set of second configuration parameters for the SP S/CG occasions in HD mode and instruct the UE to change the sets of parameters for the SPS/CG occasions to a set of third parameters for the SPS/CG occasions in FD mode and a set of fourth parameters for the SPS/CG occasions in HD mode. The instruction to change the sets of parameters may be transmitted via at least one of the DCI or the RRC message.

In some aspects, the signal to change the configured sets of parameters for the SPS/CG occasions may further include a window duration to apply the change. That is, the base station may indicate a time window in the indication to the UE to apply the set of third parameters for FD mode and the set of fourth parameters for HD mode. For example, the time window may be indicated as a number of SPS/CG occasions following the first SPS/CG occasion after receiving the DCI indicating the UE to change the set of parameters of the SPS/CG occasions.

In one aspect, the signal to change the configured sets of parameters for the SPS/CG occasions may not include the time window, and the changed sets of parameters may be by default applied for the remaining SPS/CG occasions. That is, the base station and the UE may be configured to apply the set of third parameters for FD mode and the set of fourth parameters for HD mode to the remaining SPS/CG occasions when the instruction to apply the set of third parameters for FD mode and the set of fourth parameters for HD mode does not include a time window to apply.

In another aspect, instead of the time window, the indication to change the configured sets of parameters for the SPS/CG occasions may include a bitmap that indicates the bitmapped occasion numbers to apply the changed parameters. That is, the indication to change the configured sets of parameters for the SPS/CG occasions may include the bitmap indicating a set of SPS/CG occasions to apply the changed sets of parameters for the SPS/CG occasions. The base station may transmit the indication to apply the set of third parameters for FD mode and the set of fourth parameters for HD mode, including a bitmap indicating a set of SPS/CG occasions to apply the set of third parameters for FD mode and the set of fourth parameters for HD mode. For example, the bitmap may indicate 1, 3, 5, 7, and 9, which indicates that the base station and the UE may apply the set of third parameters for FD mode and the set of fourth parameters for HD mode to the first, third, fifth, seventh, and ninth occasions after receiving the DCI indicating the UE to change the set of parameters of the SPS/CG occasions.

In some aspects, the SPS and the CG may include per occasion repetition, and the SPS/CG occasions may be retransmitted based on the per occasion repetition. That is, each SPS/CG occasion may be retransmitted based on the per occasion repetition. Based on the different repetition numbers or durations, the per occasion parameters may change, different sets of parameters may be applied to the retransmissions of the SPS/CG occasions. That is, a different set of parameters, such as guard band, beam, etc., may be applied to the retransmissions of the SPS/CG occasions, and the set of parameters to apply to the retransmissions of the SPS/CG occasions may be based on at least one of the repetition number or the duration of the repetition.

The sets of configuration parameters for HD mode and FD mode may include a configurable parameter. In one aspect, the configurable parameter may include a frequency offset parameter, i.e., a guard band, between the DL transmission and the UL transmission. That is, the set of configuration parameters for HD mode and FD mode may further include the parameter configuring at least one of an UL frequency offset from the DL transmission or a DL frequency offset from the UL transmission. By including the parameter for configuring the frequency offset parameter, the network may reduce the amount of signaling that may be provided to indicate the frequency offset parameter and thus reduce the signaling overhead.

In one aspect, the sets of configuration parameters for HD mode and FD mode may not indicate the guard band between the DL transmission and the UE transmission, and the base station and the UE may follow a preconfigured DL and UL frequency allocations table indicating the guard band between the DL and UL resources.

Figure 6:
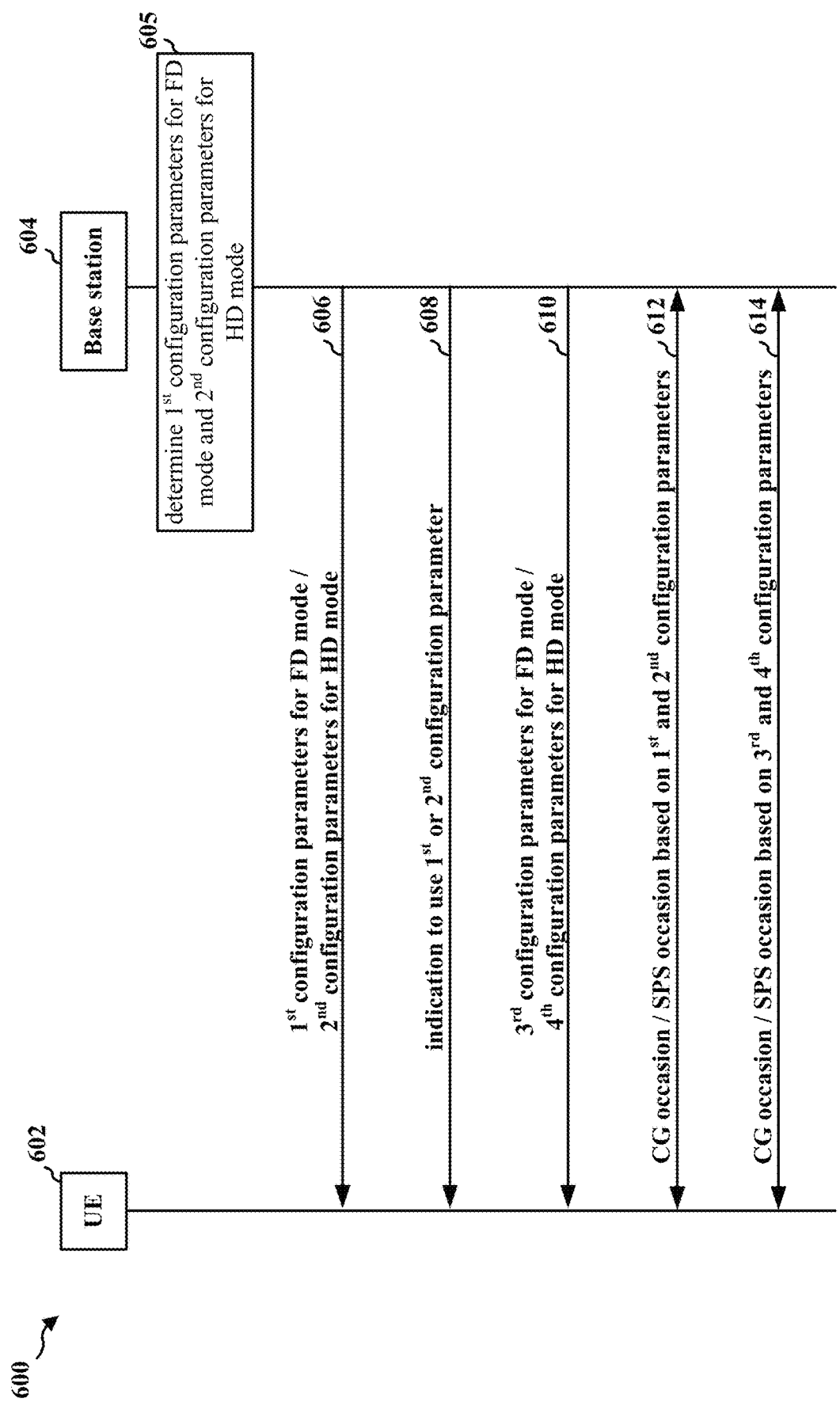
FIG. 6 is a communication diagram of a method of wireless communication.

FIG. 6 is a communication diagram 600 of a method of wireless communication. The communication diagram 600 may include a UE 602 and a base station 604. The base station 604 may transmit, to the UE 602, one or more sets of configurations parameters for an FD mode and an HD mode, and the base station 604 and the UE 602 may communicate via at least one of one or more SPS occasions or one or more CG occasions based on the one or more sets of configurations parameters for the FD mode and the HD mode.

At 605, the base station 604 determines one or more first configuration parameters for an FD mode and one or more second configuration parameters for an HD mode, the one or more first configuration parameters and the one or more second configuration parameters being associated with at least one of one or more SPS occasions or one or more CG occasions.

At 606, the base station 604 transmits, to at least one UE, a first signal of the one or more first configuration parameters and the one or more second configuration parameters. The UE 602 receives, from the base station 604, the first signal of one or more first configuration parameters for the FD mode and one or more second configuration parameters for the HD mode. The first signal may be transmitted via at least one of the RRC signaling or the DCI.

In one aspect, the one or more first configuration parameters may be associated with a first subset of one or more SPS configurations or one or more SPS occasions within an SRS configuration or associated with a first subset of one or more CG configurations or one or more CG occasions within a CG configuration, and the one or more second configuration parameters may be associated with a second subset of one or more SPS configurations or one or more SPS occasions within an SRS configuration or associated with a second subset of one or more CG configurations or one or more CG occasions within a CG configuration. In another aspect, the one or more first configuration parameters may include at least one of at least one DL and UL beam pair for FD mode, one or more power control parameters, a Tx power, or an MCS, and the one or more second configuration parameters may include at least one of at least one DL or UL beam for HD mode, one or more power control parameters, a Tx power, or an MCS.

At 608, the base station 604 may transmit, to the UE 602, an indication to apply the one or more first configuration parameters and the one or more second configuration parameters, the indication corresponding to activation or release of at least one of the one or more SPS occasions or the one or more CG occasions. The UE 602 may receive, from the base station 604, an indication to apply the one or more first configuration parameters and the one or more second configuration parameters, the indication corresponding to activation or release of at least one of the one or more SPS occasions or the one or more CG occasions. The indication may be transmitted via at least one of the RRC signaling or the DCI.

At 610, the base station 604 may transmit, to the UE 602, a second signal of a change to at least one of one or more third configuration parameters for the FD mode or one or more fourth configuration parameters for the HD mode, the one or more third configuration parameters and the one or more fourth configuration parameters being associated with at least one of one or more SPS occasions or one or more CG occasions. The UE 602 may receive, from the base station 604, the second signal of a change to at least one of one or more third configuration parameters for the FD mode or one or more fourth configuration parameters for the HD mode, the one or more third configuration parameters and the one or more fourth configuration parameters being associated with at least one of one or more SPS occasions or one or more CG occasions. The second signal may be transmitted via at least one of the RRC signaling or the DCI.

In one aspect, the second signal may include a time window to communicate with the UE 602 based on at least one of the one or more third configuration parameters or the one or more fourth configuration parameters. In another aspect, the second signal may include a bitmap indicating at least one of the one or more SPS occasions or the one or more CG occasions to apply at least one of the one or more third configuration parameters or the one or more fourth configuration parameters in communicating with the UE 602. The second signal may be received via at least one of the RRC signaling or the DCI. The one or more third configuration parameters or the one or more fourth configuration parameters may be applied for retransmissions of the one or more SPS occasions or the one or more CG occasions based on per occasion repetition of the one or more SPS occasions or the one or more CG occasions. In one aspect, the second signal may include a configurable parameter indicating at least one frequency offset between a downlink transmission and an uplink transmission for FD mode.

At 612, the base station 604 and the UE 602 communicate with each other via at least one of the one or more SPS occasions or the one or more CG occasions based on at least one of the one or more first configuration parameters or the one or more second configuration parameters. In one aspect, the base station 604 and the UE 602 may apply the one or more first configuration parameters or the one or more second configuration parameters to at least one of the one or more SPS occasions or the one or more CG occasions based on the indication to apply the one or more first configuration parameters and the one or more second configuration parameters at 608. In another aspect, the base station 604 and the UE 602 may apply the one or more first configuration parameters or the one or more second configuration parameters to at least one of the one or more SPS occasions or the one or more CG occasions based on activation or release of the at least one of the one or more SPS occasions or the one or more CG occasions.

At 614, the base station 604 and the UE 602 may communicate with each other via at least one of the one or more SPS occasions or the one or more CG occasions based on at least one of the one or more third configuration parameters or the one or more fourth configuration parameters. In one aspect, the base station 604 and the UE 602 may apply the one or more third configuration parameters or the one or more fourth configuration parameters to at least one of the one or more SPS occasions or the one or more CG occasions based on the time window included in the second signal. In another aspect, the base station 604 and the UE 602 may apply the one or more third configuration parameters or the one or more fourth configuration parameters to at least one of the one or more SPS occasions or the one or more CG occasions based on the bitmap included in the second signal.

Figure 7A:
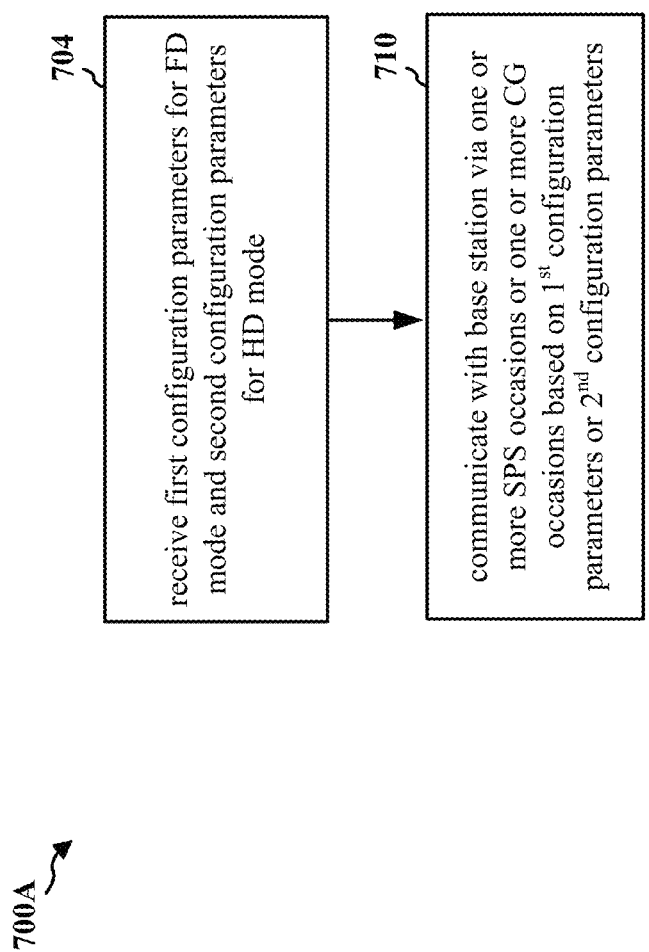
FIG. 7A is a flowchart of a method of wireless communication.
Figure 7B:
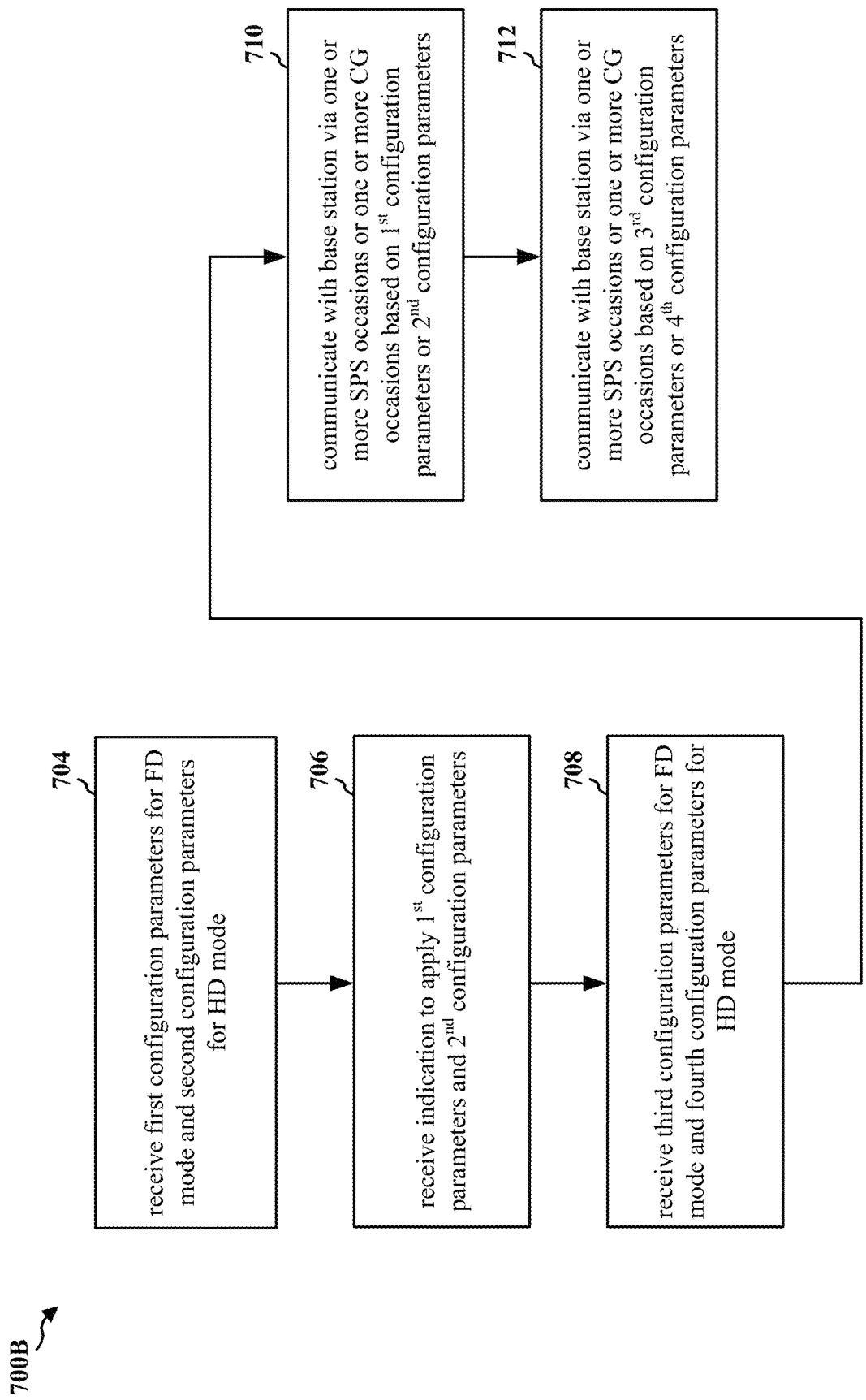
FIG. 7B is a flowchart of a method of wireless communication.

FIGS. 7A and 7B are flowcharts 700A and 700B of a method of wireless communication. The method may be performed by a UE (e.g., the UE 104/406/426/428/446/512/514/602; the apparatus 902). The UE may receive, from a base station, one or more sets of configurations parameters for the FD mode and the HD mode, and the UE may communicate with the base station via at least one of one or more SPS occasions or one or more CG occasions based on the one or more sets of configurations parameters for the FD mode and the HD mode.

At 704, the UE receives, from a base station, a first signal of one or more first configuration parameters for an FD mode and one or more second configuration parameters for an HD mode, the one or more first configuration parameters and the one or more second configuration parameters being associated with at least one of one or more SPS occasions or one or more CG occasions. The first signal may be transmitted via at least one of the RRC signaling or the DCI. For example, at 606 of FIG. 6, the UE 602 may receive the first signal of one or more first configuration parameters for the FD mode and the one or more second configuration parameters for the HD mode from the base station 604. Furthermore, 704 may be performed by an SPS/CG parameter semi-persistent configuration component 940.

In one aspect, the one or more first configuration parameters may be associated with a first subset of one or more SPS configurations or one or more SPS occasions within an SRS configuration or associated with a first subset of one or more CG configurations or one or more CG occasions within a CG configuration, and the one or more second configuration parameters may be associated with a second subset of one or more SPS configurations or one or more SPS occasions within an SRS configuration or associated with a second subset of one or more CG configurations or one or more CG occasions within a CG configuration. In another aspect, the one or more first configuration parameters may include at least one of at least one DL and UL beam pair for FD mode, one or more power control parameters, a Tx power, or an MCS, and the one or more second configuration parameters may include at least one of at least one DL or UL beam for HD mode, one or more power control parameters, the Tx power, or the MCS.

At 706, the UE may receive, from the base station, an indication to apply the one or more first configuration parameters and the one or more second configuration parameters, the indication corresponding to activation or release of at least one of the one or more SPS occasions or the one or more CG occasions. The indication may be transmitted via at least one of the RRC signaling or the DCI. For example, at 608 of FIG. 6, the UE 602 may receive the indication to apply the one or more first configuration parameters and the one or more second configuration parameters from the base station 604. Furthermore, 706 may be performed by the SPS/CG parameter semi-persistent configuration component 940.

At 708, the UE may receive, from the base station, a second signal of a change to at least one of one or more third configuration parameters for the FD mode or one or more fourth configuration parameters for the HD mode, the one or more third configuration parameters and the one or more fourth configuration parameters being associated with at least one of one or more SPS occasions or one or more CG occasions. The second signal may be transmitted via at least one of the RRC signaling or the DCI. For example, at 610 of FIG. 6, the UE 602 may receive, from the base station 604, the second signal of a change to at least one of one or more third configuration parameters for the FD mode or one or more fourth configuration parameters for the HD mode. Furthermore, 708 may be performed by the SPS/CG parameter semi-persistent configuration component 940.

In one aspect, the second signal may include a time window to communicate with at least one UE based on at least one of the one or more third configuration parameters or the one or more fourth configuration parameters. In another aspect, the second signal may include a bitmap indicating at least one of the one or more SPS occasions or the one or more CG occasions to apply at least one of the one or more third configuration parameters or the one or more fourth configuration parameters in communicating with the at least one UE. The second signal may be received via at least one of the RRC signaling or the DCI. The one or more third configuration parameters or the one or more fourth configuration parameters may be applied for retransmissions of the one or more SPS occasions or the one or more CG occasions based on per occasion repetition of the one or more SPS occasions or the one or more CG occasions. The second signal may include a configurable parameter indicating at least one frequency offset between a downlink transmission and an uplink transmission for FD mode.

At 710, the UE communicates with the base station via at least one of the one or more SPS occasions or the one or more CG occasions based on at least one of the one or more first configuration parameters or the one or more second configuration parameters. In one aspect, the UE may apply the one or more first configuration parameters or the one or more second configuration parameters to at least one of the one or more SPS occasions or the one or more CG occasions based on the indication to apply the one or more first configuration parameters and the one or more second configuration parameters at 608. In another aspect, the UE may apply the one or more first configuration parameters or the one or more second configuration parameters to at least one of the one or more SPS occasions or the one or more CG occasions based on activation or release of at least one of the one or more SPS occasions or the one or more CG occasions. For example, at 612 of FIG. 6, the UE 602 may communicate with the base station 604 via at least one of the one or more SPS occasions or the one or more CG occasions based on at least one of the one or more first configuration parameters or the one or more second configuration parameters. Furthermore, 710 may be performed by an SPS/CG occasion communication component 942.

At 712, the UE may communicate with the base station via at least one of the one or more SPS occasions or the one or more CG occasions based on at least one of the one or more third configuration parameters or the one or more fourth configuration parameters. In one aspect, the UE may apply the one or more third configuration parameters or the one or more fourth configuration parameters to at least one of the one or more SPS occasions or the one or more CG occasions based on the time window included in the second signal. In another aspect, the UE may apply the one or more third configuration parameters or the one or more fourth configuration parameters to at least one of the one or more SPS occasions or the one or more CG occasions based on the bitmap included in the second signal. For example, at 614 of FIG. 6, the UE 602 may communicate with the base station 604 at least one of the one or more SPS occasions or the one or more CG occasions based on at least one of the one or more third configuration parameters or the one or more fourth configuration parameters. Furthermore, 712 may be performed by the SPS/CG occasion communication component 942.

Figure 8A:
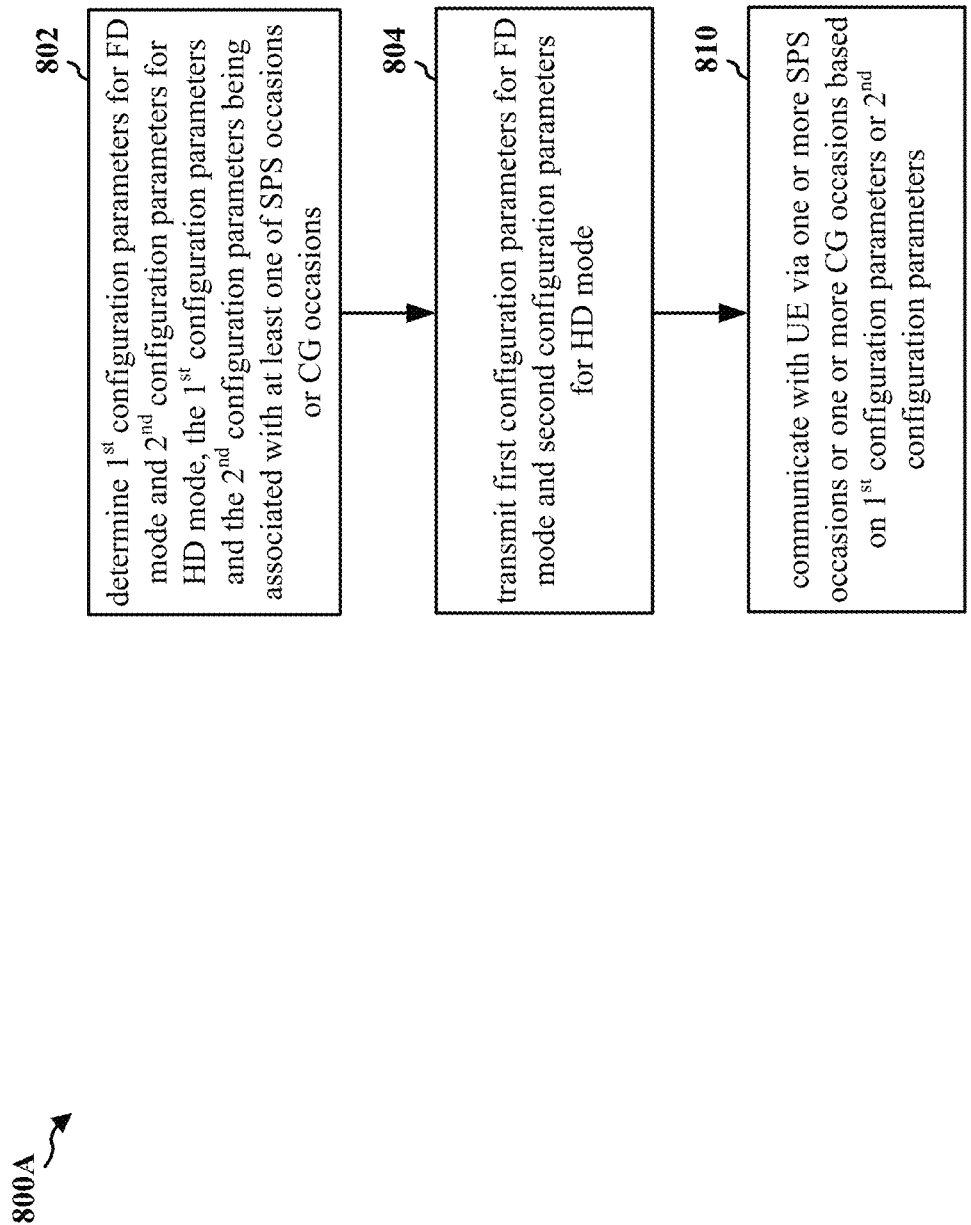
FIG. 8A is a flowchart of a method of wireless communication.
Figure 8B:
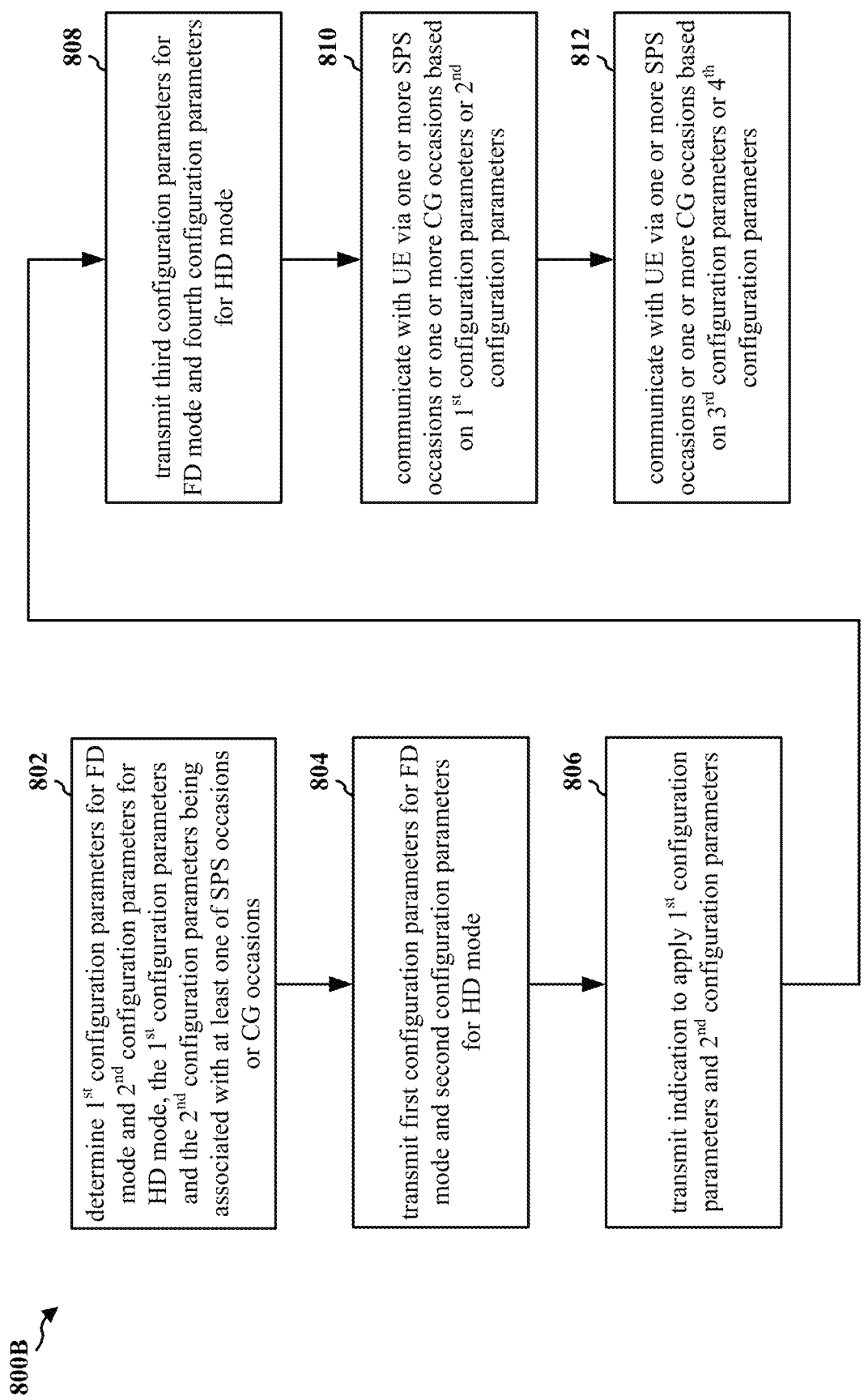
FIG. 8B is a flowchart of a method of wireless communication.

FIGS. 8A and 8B are flowcharts 800A and 800B of a method of wireless communication. The method may be performed by a base station (e.g., the base station 102/180/402/404/422/442/502/504/604; the apparatus 1002). The base station may transmit, to a UE, one or more sets of configurations parameters for the FD mode and the HD mode, and the base station may communicate with the UE via at least one of one or more SPS occasions or one or more CG occasions based on the one or more sets of configurations parameters for the FD mode and the HD mode.

At 802, the base station determines one or more first configuration parameters for an FD mode and one or more second configuration parameters for an HD mode, the one or more first configuration parameters and the one or more second configuration parameters being associated with at least one of one or more SPS occasions or one or more CG occasions. For example, at 605 of FIG. 6, the base station 604 may determine one or more first configuration parameters for the FD mode and one or more second configuration parameters for the HD mode, the one or more first configuration parameters and the one or more second configuration parameters being associated with at least one of one or more SPS occasions or one or more CG occasions. Furthermore, 802 may be performed by an SPS/CG parameter semi-persistent configuration component 1040.

At 804, the base station transmits, to at least one UE, a first signal of the one or more first configuration parameters and the one or more second configuration parameters. The first signal may be transmitted via at least one of the RRC signaling or the DCI. For example, at 606 of FIG. 6, the base station 604 may transmit the first signal of the one or more first configuration parameters and the one or more second configuration parameters to the UE 602. Furthermore, 804 may be performed by the SPS/CG parameter semi-persistent configuration component 1040.

In one aspect, the one or more first configuration parameters may be associated with a first subset of one or more SPS configurations or one or more SPS occasions within an SRS configuration or associated with a first subset of one or more CG configurations or one or more CG occasions within a CG configuration, and the one or more second configuration parameters may be associated with a second subset of one or more SPS configurations or one or more SPS occasions within an SRS configuration or associated with a second subset of one or more CG configurations or one or more CG occasions within a CG configuration. In another aspect, the one or more first configuration parameters may include at least one of at least one DL and UL beam pair for FD mode, one or more power control parameters, a Tx power, or an MCS, and the one or more second configuration parameters may include at least one of at least one DL or UL beam for HD mode, one or more power control parameters, a Tx power, or an MCS.

At 806, the base station may transmit, to the at least one UE, an indication to apply the one or more first configuration parameters and the one or more second configuration parameters, the indication corresponding to activation or release of at least one of the one or more SPS occasions or the one or more CG occasions. The indication may be transmitted via at least one of the RRC signaling or the DCI. For example, at 608 of FIG. 6, the base station 604 may transmit, to the UE 602, the indication to apply the one or more first configuration parameters and the one or more second configuration parameters. Furthermore, 806 may be performed by the SPS/CG parameter semi-persistent configuration component 1040.

At 808, the base station may transmit, to at least one UE, a second signal of a change to at least one of one or more third configuration parameters for the FD mode or one or more fourth configuration parameters for the HD mode, the one or more third configuration parameters and the one or more fourth configuration parameters being associated with at least one of one or more SPS occasions or one or more CG occasions. The second signal may be transmitted via at least one of the RRC signaling or the DCI. For example, at 610 of FIG. 6, the base station 604 may transmit, to the UE 602, the second signal of a change to at least one of one or more third configuration parameters for the FD mode or one or more fourth configuration parameters for the HD mode. Furthermore, 808 may be performed by the SPS/CG parameter semi-persistent configuration component 1040.

In one aspect, the second signal may include a time window to communicate with at least one UE based on at least one of the one or more third configuration parameters or the one or more fourth configuration parameters. In another aspect, the second signal may include a bitmap indicating at least one of the one or more SPS occasions or the one or more CG occasions to apply at least one of the one or more third configuration parameters or the one or more fourth configuration parameters in communicating with the at least one UE. The second signal may be received via at least one of the RRC signaling or the DCI. The one or more third configuration parameters or the one or more fourth configuration parameters may be applied for retransmissions of the one or more SPS occasions or the one or more CG occasions based on per occasion repetition of the one or more SPS occasions or the one or more CG occasions. In one aspect, the second signal may include a configurable parameter indicating at least one frequency offset between a downlink transmission and an uplink transmission for FD mode.

At 810, the base station communicates with at least one UE via at least one of the one or more SPS occasions or the one or more CG occasions based on at least one of the one or more first configuration parameters or the one or more second configuration parameters. In one aspect, the base station may apply the one or more first configuration parameters or the one or more second configuration parameters to at least one of the one or more SPS occasions or the one or more CG occasions based on the indication to apply the one or more first configuration parameters and the one or more second configuration parameters at 608. In another aspect, the base station may apply the one or more first configuration parameters or the one or more second configuration parameters to at least one of the one or more SPS occasions or the one or more CG occasions based on activation or release of the at least one of the one or more SPS occasions or the one or more CG occasions. For example, at 612 of FIG. 6, the base station 604 may communicate with the UE 602 via at least one of the one or more SPS occasions or the one or more CG occasions based on at least one of the one or more first configuration parameters or the one or more second configuration parameters. Furthermore, 810 may be performed by an SPS/CG occasion communication component 1042.

At 812, the base station may communicate with at least one UE via at least one of the one or more SPS occasions or the one or more CG occasions based on at least one of the one or more third configuration parameters or the one or more fourth configuration parameters. In one aspect, the base station and the at least one UE may apply the one or more third configuration parameters or the one or more fourth configuration parameters to at least one of the one or more SPS occasions or the one or more CG occasions based on the time window included in the second signal. In another aspect, the base station and the at least one UE may apply the one or more third configuration parameters or the one or more fourth configuration parameters to at least one of the one or more SPS occasions or the one or more CG occasions based on the bitmap included in the second signal. For example, at 614 of FIG. 6, the base station 604 may communicate with the UE via at least one of the one or more SPS occasions or the one or more CG occasions based on at least one of the one or more third configuration parameters or the one or more fourth configuration parameters. Furthermore, 812 may be performed by the SPS/CG occasion communication component 1042.

Figure 9:
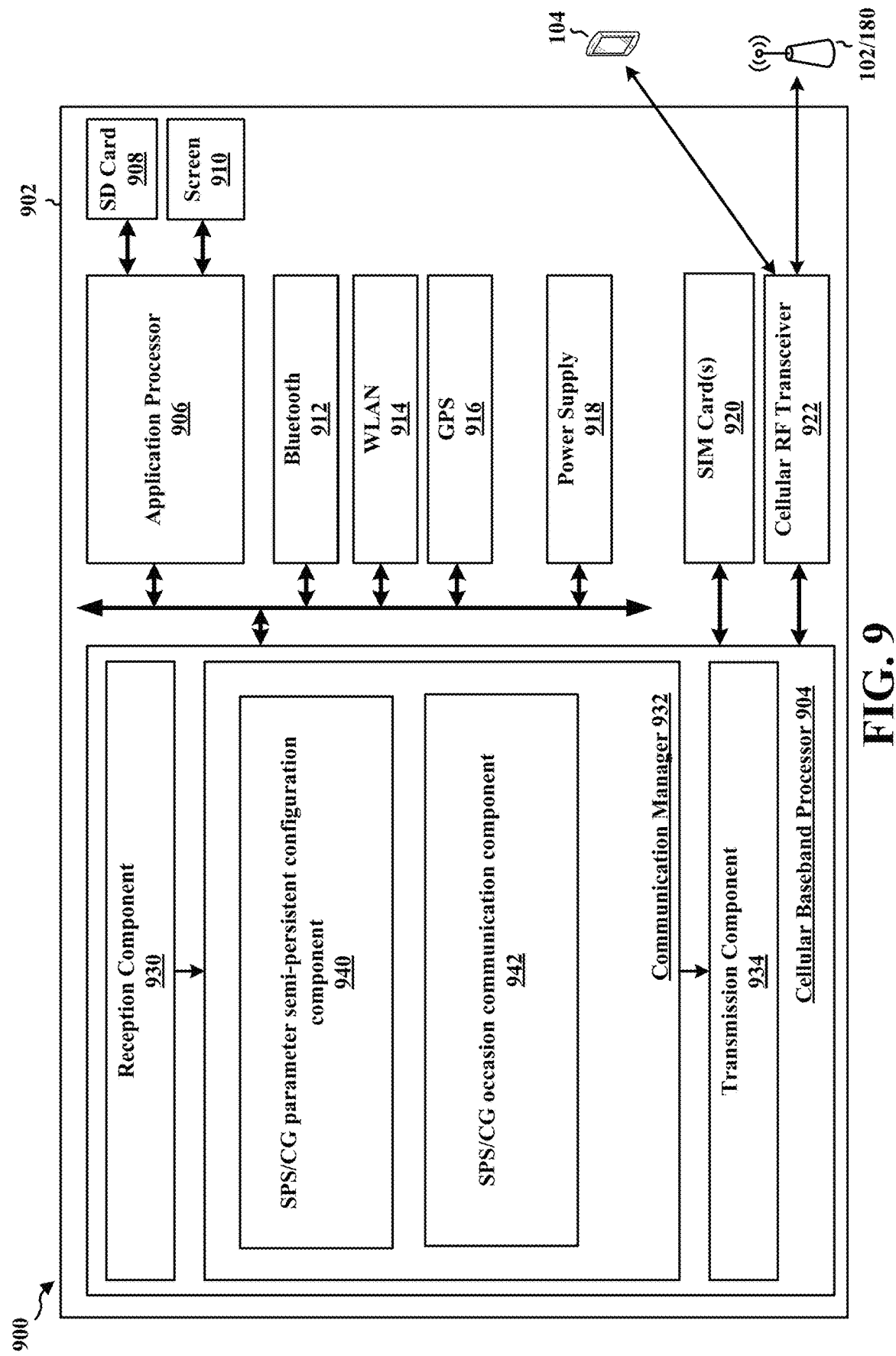
FIG. 9 is a diagram illustrating an example of a hardware implementation for an example apparatus.

FIG. 9 is a diagram 900 illustrating an example of a hardware implementation for an apparatus 902. The apparatus 902 is a UE and includes a cellular baseband processor 904 (also referred to as a modem) coupled to a cellular RF transceiver 922 and one or more subscriber identity modules (SIM) cards 920, an application processor 906 coupled to a secure digital (SD) card 908 and a screen 910, a Bluetooth module 912, a wireless local area network (WLAN) module 914, a Global Positioning System (GPS) module 916, and a power supply 918. The cellular baseband processor 904 communicates through the cellular RF transceiver 922 with the UE 104 and/or BS 102/180. The cellular baseband processor 904 may include a computer-readable medium/memory. The computer-readable medium/memory may be non-transitory. The cellular baseband processor 904 is responsible for general processing, including the execution of software stored on the computer-readable medium/memory. The software, when executed by the cellular baseband processor 904, causes the cellular baseband processor 904 to perform the various functions described supra. The computer-readable medium/memory may also be used for storing data that is manipulated by the cellular baseband processor 904 when executing software. The cellular baseband processor 904 further includes a reception component 930, a communication manager 932, and a transmission component 934. The communication manager 932 includes the one or more illustrated components. The components within the communication manager 932 may be stored in the computer-readable medium/memory and/or configured as hardware within the cellular baseband processor 904. The cellular baseband processor 904 may be a component of the UE 350 and may include the memory 360 and/or at least one of the TX processor 368, the RX processor 356, and the controller/processor 359. In one configuration, the apparatus 902 may be a modem chip and include just the baseband processor 904, and in another configuration, the apparatus 902 may be the entire UE (e.g., see 350 of FIG. 3) and include the aforediscussed additional modules of the apparatus 902.

The communication manager 932 includes an SPS/CG parameter semi-persistent configuration component 940 that is configured to receive a first signal of one or more first configuration parameters for an FD mode and one or more second configuration parameters for an HD mode, receive an indication to apply the one or more first configuration parameters and the one or more second configuration parameters, and receive the second signal of a change to at least one of one or more third configuration parameters for the FD mode or one or more fourth configuration parameters for the HD mode, e.g., as described in connection with 704, 706, and 708. The communication manager 932 further includes an SPS/CG occasion communication component 942 that is configured to communicate with the base station via at least one of the one or more SPS occasions or the one or more CG occasions based on at least one of the one or more first configuration parameters or the one or more second configuration parameters, or based on at least one of the one or more third configuration parameters or the one or more fourth configuration parameters, e.g., as described in connection with 710 and 712.

The apparatus may include additional components that perform each of the blocks of the algorithm in the aforementioned flowcharts of FIGS. 6 and 7A/7B. As such, each block in the aforementioned flowcharts of FIGS. 6 and 7A/7B may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the cellular baseband processor 904, includes means for receiving, from a base station, a first signal of one or more first configuration parameters for an FD mode and one or more second configuration parameters for an HD mode, the one or more first configuration parameters and the one or more second configuration parameters being associated with at least one of one or more SPS occasions or one or more CG occasions, and means for communicating, with the base station via at least one of the one or more SPS occasions or the one or more CG occasions, based on at least one of the one or more first configuration parameters or the one or more second configuration parameters. The apparatus 902 includes means for receiving, from the base station, an indication of using the one or more first configuration parameters and the one or more second configuration parameters, the indication corresponding to activation or release of at least one of the one or more SPS occasions or the one or more CG occasions. The apparatus 902 includes means for receiving, from the base station, a second signal of a change to at least one of one or more third configuration parameters for the FD mode or one or more fourth configuration parameters for the HD mode, the one or more third configuration parameters and the one or more fourth configuration parameters being associated with at least one of one or more SPS occasions or one or more CG occasions, and means for communicating, with the base station via at least one of the one or more SPS occasions or the one or more CG occasions, based on at least one of the one or more third configuration parameters or the one or more fourth configuration parameters. The aforementioned means may be one or more of the aforementioned components of the apparatus 902 configured to perform the functions recited by the aforementioned means. As described supra, the apparatus 902 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 10:
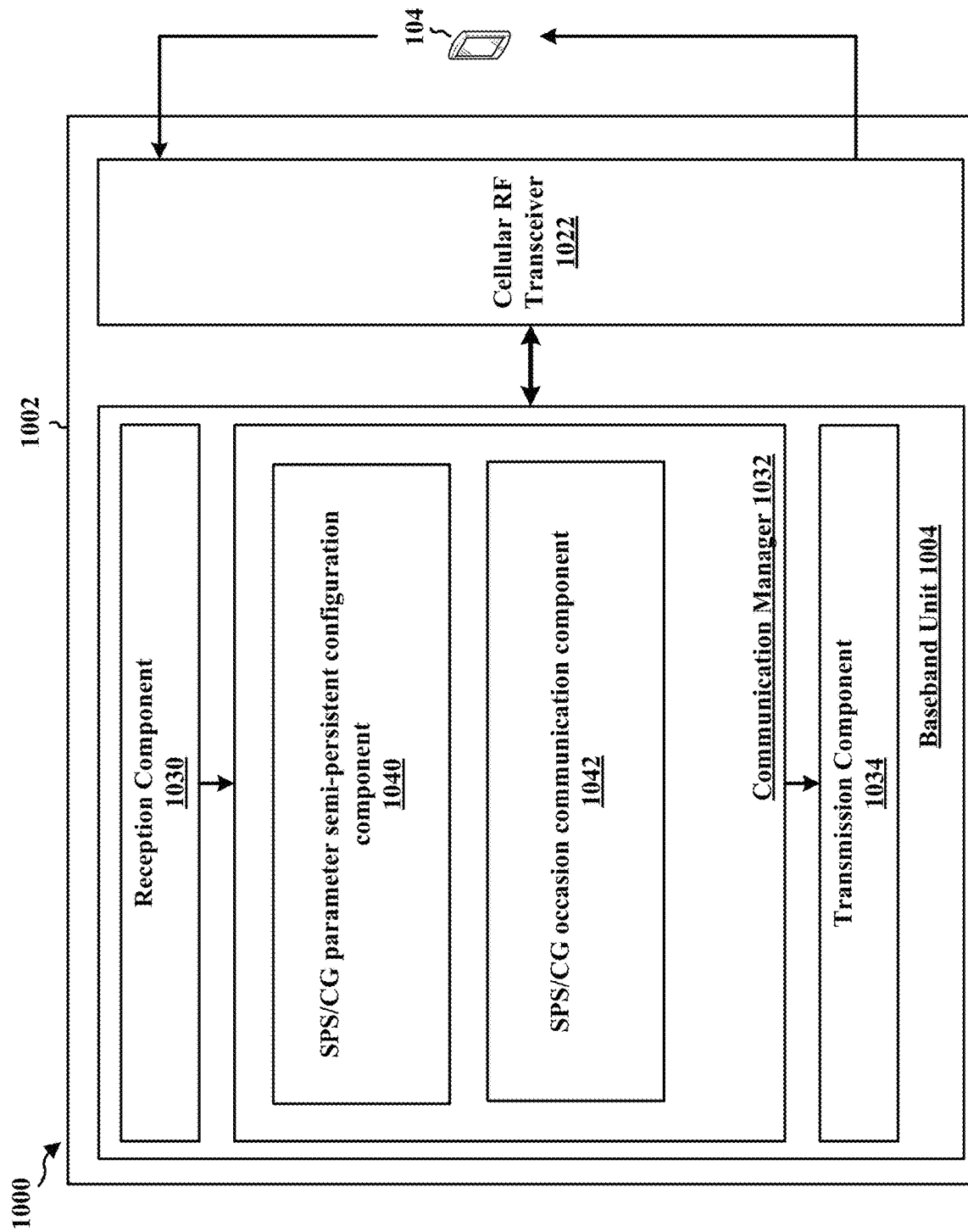
FIG. 10 is a diagram illustrating an example of a hardware implementation for an example apparatus.

FIG. 10 is a diagram 1000 illustrating an example of a hardware implementation for an apparatus 1002. The apparatus 1002 is a BS and includes a baseband unit 1004. The baseband unit 1004 may communicate through a cellular RF transceiver 1022 with the UE 104. The baseband unit 1004 may include a computer-readable medium/memory. The baseband unit 1004 is responsible for general processing, including the execution of software stored on the computer-readable medium/memory. The software, when executed by the baseband unit 1004, causes the baseband unit 1004 to perform the various functions described supra. The computer-readable medium/memory may also be used for storing data that is manipulated by the baseband unit 1004 when executing software. The baseband unit 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the baseband unit 1004. The baseband unit 1004 may be a component of the base station 310 and may include the memory 376 and/or at least one of the TX processor 316, the RX processor 370, and the controller/processor 375.

The communication manager 1032 includes an SPS/CG parameter semi-persistent configuration component 1040 that is configured to determine one or more first configuration parameters for an FD mode and one or more second configuration parameters for an HD mode, transmit, to at least one UE, a first signal of the one or more first configuration parameters and the one or more second configuration parameters, transmit, to the at least one UE, an indication to apply the one or more first configuration parameters and the one or more second configuration parameters, and transmit, to the at least one UE, a second signal of a change to at least one of one or more third configuration parameters for the FD mode or one or more fourth configuration parameters for the HD mode, e.g., as described in connection with 802, 804, 806, and 808. The communication manager 1032 further includes an SPS/CG occasion communication component 1042 that is configured to communicate with the at least one UE via at least one of the one or more SPS occasions or the one or more CG occasions based on at least one of the one or more first configuration parameters or the one or more second configuration parameters, or based on at least one of the one or more third configuration parameters or the one or more fourth configuration parameters, e.g., as described in connection with 810 and 812.

The apparatus may include additional components that perform each of the blocks of the algorithm in the aforementioned flowcharts of FIGS. 6 and 8A/8B. As such, each block in the aforementioned flowcharts of FIGS. 6 and 8A/8B may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the baseband unit 1004, includes means for determining one or more first configuration parameters for an FD mode and one or more second configuration parameters for an HD mode, the one or more first configuration parameters and the one or more second configuration parameters being associated with at least one of one or more SPS occasions or one or more CG occasions, means for transmitting, to at least one UE, a first signal of the one or more first configuration parameters and the one or more second configuration parameters, and means for communicating, with the at least one UE via at least one of the one or more SPS occasions or the one or more CG occasions, based on at least one of the one or more first configuration parameters or the one or more second configuration parameters. The apparatus 1002 includes means for transmitting, to the at least one UE, an indication of using the one or more first configuration parameters and the one or more second configuration parameters, the indication corresponding to activation or release of at least one of the one or more SPS occasions or the one or more CG occasions. The apparatus 1002 includes means for transmitting, to the at least one UE, a second signal of a change to at least one of one or more third configuration parameters for the FD mode or one or more fourth configuration parameters for the HD mode, the one or more third configuration parameters and the one or more fourth configuration parameters being associated with at least one of one or more SPS occasions or one or more CG occasions, and means for communicating, with the at least one UE via at least one of the one or more SPS occasions or the one or more CG occasions, based on at least one of the one or more third configuration parameters or the one or more fourth configuration parameters. The aforementioned means may be one or more of the aforementioned components of the apparatus 1002 configured to perform the functions recited by the aforementioned means. As described supra, the apparatus 1002 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Aspects presented herein may provide a base station and a UE. The base station may transmit, to the UE, one or more sets of configurations parameters for FD mode and HD mode, and the base station and the UE may communicate via at least one of one or more SPS occasions or one or more CG occasions based on the one or more sets of configurations parameters for FD mode and HD mode.

The base station may determine one or more first configuration parameters for FD mode and one or more second configuration parameters for HD mode, the one or more first configuration parameters and the one or more second configuration parameters being associated with at least one of one or more SPS occasions or one or more CG occasions, transmit, to the UE, a first signal of the one or more first configuration parameters and the one or more second configuration parameters. The base station and the UE may communicate with each other via at least one of the one or more SPS occasions or the one or more CG occasions based on at least one of the one or more first configuration parameters or the one or more second configuration parameters.

The one or more first configuration parameters may be associated with a first subset of one or more SPS configurations or one or more SPS occasions within an SRS configuration or associated with a first subset of one or more CG configurations or one or more CG occasions within a CG configuration, and the one or more second configuration parameters may be associated with a second subset of one or more SPS configurations or one or more SPS occasions within an SRS configuration or associated with a second subset of one or more CG configurations or one or more CG occasions within a CG configuration. The one or more first configuration parameters may include at least one of at least one DL and UL beam pair for FD mode, one or more power control parameters, a Tx power, or a MCS, and the one or more second configuration parameters may include at least one of at least one DL or UL beam for HD mode, one or more power control parameters, a Tx power, or an MCS.

In one aspect, the UE may apply at least one of the one or more first configuration parameters or the one or more second configuration parameters based on activation or release of at least one of the one or more SPS occasions or the one or more CG occasions. In another aspect, the UE may receive, from the base station, an indication to apply the one or more first configuration parameters and the one or more second configuration parameters, the indication corresponding to activation or release of at least one of the one or more SPS occasions or the one or more CG occasions.

The base station may transmit, to the UE, a second signal to change parameters to at least one of one or more third configuration parameters for FD mode or one or more fourth configuration parameters for HD mode, and the base station and the UE may communicate with each other via at least one of the one or more SPS occasions or the one or more CG occasions based on at least one of the one or more third configuration parameters or the one or more fourth configuration parameters.

In one aspect, the second signal may include a time window to communicate with the UE based on at least one of the one or more third configuration parameters or the one or more fourth configuration parameters. In another aspect, the second signal may include a bitmap indicating at least one of the one or more SPS occasions or the one or more CG occasions to apply at least one of the one or more third configuration parameters or the one or more fourth configuration parameters in communicating with the UE. In another aspect, the one or more third configuration parameters or the one or more fourth configuration parameters may be applied for retransmissions of the one or more SPS occasions or the one or more CG occasions, based on per occasion repetition of the one or more SPS occasions or the one or more CG occasions. In yet another aspect, the second signal may include a configurable parameter indicating at least one frequency offset between a downlink transmission and an uplink transmission for FD mode.

The first signal, the second signal, and the indication to change parameters may be transmitted via at least one of the RRC signaling or the DCI.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a UE, the method including receiving, from a base station, a first signal of one or more first configuration parameters for an FD mode and one or more second configuration parameters for an HD mode, the one or more first configuration parameters and the one or more second configuration parameters being associated with at least one of one or more SPS occasions or one or more CG occasions, and communicating, with the base station via at least one of the one or more SPS occasions or the one or more CG occasions based on at least one of the one or more first configuration parameters or the one or more second configuration parameters.

Aspect 2 is the method of aspect 1, where the one or more first configuration parameters are associated with a first subset of one or more SPS configurations or one or more SPS occasions within an SRS configuration or associated with a first subset of one or more CG configurations or one or more CG occasions within a CG configuration, and the one or more second configuration parameters are associated with a second subset of one or more SPS configurations or one or more SPS occasions within an SRS configuration or associated with a second subset of one or more CG configurations or one or more CG occasions within a CG configuration.

Aspect 3 is the method of any of aspects 1 and 2, where the one or more first configuration parameters include at least one of at least one DL and UL beam pair for FD mode, one or more power control parameters, a Tx power, or an MCS, and the one or more second configuration parameters include at least one of at least one DL or UL beam for HD mode, one or more power control parameters, a Tx power, or an MCS.

Aspect 4 is the method of any of aspects 1 to 3, where the first signal is received via at least one of RRC signaling or DCI.

Aspect 5 is the method of any of aspects 1 to 4, where at least one of the one or more first configuration parameters or the one or more second configuration parameters are applied based on activation or release of the at least one of the one or more SPS occasions or the one or more CG occasions.

Aspect 6 is the method of any of aspects 1 to 5, further including receiving, from the base station, an indication to apply the one or more first configuration parameters and the one or more second configuration parameters, the indication corresponding to activation or release of at least one of the one or more SPS occasions or the one or more CG occasions.

Aspect 7 is the method of aspect 6, where the indication is received via at least one of RRC signaling or DCI.

Aspect 8 is the method of any of aspects 1 to 7, further including receiving, from the base station, a second signal of a change to at least one of one or more third configuration parameters for the FD mode or one or more fourth configuration parameters for the HD mode, the one or more third configuration parameters and the one or more fourth configuration parameters being associated with at least one of one or more SPS occasions or one or more CG occasions, and communicating, with the base station via at least one of the one or more SPS occasions or the one or more CG occasions based on at least one of the one or more third configuration parameters or the one or more fourth configuration parameters.

Aspect 9 is the method of aspect 8, where the second signal is received via at least one of RRC signaling or DCI.

Aspect 10 is the method of any of aspects 8 and 9, where the second signal includes a time window to communicate with the base station based on the at least one of the one or more third configuration parameters or the one or more fourth configuration parameters.

Aspect 11 is the method of any of aspects 8 and 9, where the second signal includes a bitmap indicating the at least one of the one or more SPS occasions or the one or more CG occasions to apply the at least one of the one or more third configuration parameters or the one or more fourth configuration parameters in communicating with the base station.

Aspect 12 is the method of any of aspects 8 to 11, where the one or more third configuration parameters or the one or more fourth configuration parameters are applied for retransmissions of the one or more SPS occasions or the one or more CG occasions based on per occasion repetition of the one or more SPS occasions or the one or more CG occasions.

Aspect 13 is the method of any of aspects 8 to 12, where the second signal includes a configurable parameter indicating at least one frequency offset between a downlink transmission and an uplink transmission for FD mode.

Aspect 14 is an apparatus for wireless communication including at least one processor coupled to a memory and configured to implement a method as in any of aspects 1 to 13.

Aspect 15 is an apparatus for wireless communication including means for implementing a method as in any of aspects 1 to 13.

Aspect 16 is a computer-readable medium storing computer-executable code, where the code when executed by a processor causes the processor to implement a method as in any of aspects 1 to 13.

Aspect 17 is a method of wireless communication at a base station, the method including determining one or more first configuration parameters for an FD mode and one or more second configuration parameters for an HD mode, the one or more first configuration parameters and the one or more second configuration parameters being associated with at least one of one or more SPS occasions or one or more CG occasions, transmitting, to at least one UE, a first signal of the one or more first configuration parameters and the one or more second configuration parameters, and communicating, with the at least one UE via at least one of the one or more SPS occasions or the one or more CG occasions based on at least one of the one or more first configuration parameters or the one or more second configuration parameters.

Aspect 18 is the method of aspect 17, where the one or more first configuration parameters are associated with a first subset of one or more SPS configurations or one or more SPS occasions within an SRS configuration or associated with a first subset of one or more CG configurations or one or more CG occasions within a CG configuration, and the one or more second configuration parameters are associated with a second subset of one or more SPS configurations or one or more SPS occasions within an SRS configuration or associated with a second subset of one or more CG configurations or one or more CG occasions within a CG configuration.

Aspect 19 is the method of any of aspects 17 and 18, where the one or more first configuration parameters include at least one of at least one DL and UL beam pair for FD mode, one or more power control parameters, a Tx power, or an MCS, and the one or more second configuration parameters include at least one of at least one DL or UL beam for HD mode, one or more power control parameters, a Tx power, or an MCS.

Aspect 20 is the method of any of aspects 17 to 19, where the first signal is transmitted via at least one of RRC signaling or DCI.

Aspect 21 is the method of any of aspects 17 to 20, where at least one of the one or more first configuration parameters or the one or more second configuration parameters are applied based on activation or release of the at least one of the one or more SPS occasions or the one or more CG occasions.

Aspect 22 is the method of any of aspects 17 to 21, further including transmitting, to the at least one UE, an indication to apply the one or more first configuration parameters and the one or more second configuration parameters, the indication corresponding to activation or release of at least one of the one or more SPS occasions or the one or more CG occasions.

Aspect 23 is the method of aspect 22, where the indication is transmitted via at least one of RRC signaling or DCI.

Aspect 24 is the method of any of aspects 17 to 23, further including transmitting, to the at least one UE, a second signal of a change to at least one of one or more third configuration parameters for the FD mode or one or more fourth configuration parameters for the HD mode, the one or more third configuration parameters and the one or more fourth configuration parameters being associated with at least one of one or more SPS occasions or one or more CG occasions, and communicating, with the at least one UE via at least one of the one or more SPS occasions or the one or more CG occasions based on at least one of the one or more third configuration parameters or the one or more fourth configuration parameters.

Aspect 25 is the method of aspect 24, where the second signal is transmitted via at least one of RRC signaling or DCI.

Aspect 26 is the method of any of aspects 24 and 25, where the second signal includes a time window to communicate with the at least one UE based on the at least one of the one or more third configuration parameters or the one or more fourth configuration parameters.

Aspect 27 is the method of any of aspects 24 and 25, where the second signal includes a bitmap indicating the at least one of the one or more SPS occasions or the one or more CG occasions to apply the at least one of the one or more third configuration parameters or the one or more fourth configuration parameters in communicating with the at least one UE.

Aspect 28 is the method of any of aspects 24 to 27, where the one or more third configuration parameters or the one or more fourth configuration parameters are applied for retransmissions of the one or more SPS occasions or the one or more CG occasions based on per occasion repetition of the one or more SPS occasions or the one or more CG occasions.

Aspect 29 is the method of any of aspects 24 to 28, where the second signal includes a configurable parameter indicating at least one frequency offset between a downlink transmission and an uplink transmission for FD mode.

Aspect 30 is an apparatus for wireless communication including at least one processor coupled to a memory and configured to implement a method as in any of aspects 17 to 29.

Aspect 31 is an apparatus for wireless communication including means for implementing a method as in any of aspects 17 to 29.

Aspect 32 is a computer-readable medium storing computer-executable code, where the code when executed by a processor causes the processor to implement a method as in any of aspects 17 to 29.

What is claimed is:

1. An apparatus for wireless communication at a user equipment (UE), comprising:
   memory; and
   at least one processor coupled to the memory and configured to cause the apparatus to:
   receive, from a base station, a first signal of one or more first configuration parameters for a full duplex (FD) mode and one or more second configuration parameters for a half duplex (HD) mode, the one or more first configuration parameters and the one or more second configuration parameters being associated with at least one of one or more semi-persistent scheduling (SPS) occasions or one or more configured grant (CG) occasions; and
   communicate with the base station via at least one of the one or more SPS occasions or the one or more CG occasions based on at least one of the one or more first configuration parameters or the one or more second configuration parameters.

2. The apparatus of claim 1, wherein the one or more first configuration parameters are associated with a first subset of one or more SPS configurations or one or more SPS occasions within an SRS configuration or associated with a first subset of one or more CG configurations or one or more CG occasions within a CG configuration, and the one or more second configuration parameters are associated with a second subset of one or more SPS configurations or one or more SPS occasions within an SRS configuration or associated with a second subset of one or more CG configurations or one or more CG occasions within a CG configuration.

3. The apparatus of claim 1, wherein the one or more first configuration parameters include at least one of: at least one downlink (DL) and uplink (UL) beam pair for FD mode, one or more power control parameters, a transmission (Tx) power, or a modulation and coding scheme (MCS), and the one or more second configuration parameters include at least one of: at least one DL or UL beam for HD mode, one or more power control parameters, a Tx power, or an MCS.

4. The apparatus of claim 1, wherein to receive the first signal, the at least one processor is configured to cause the apparatus to receive the first signal via at least one of radio resource control (RRC) signaling or downlink control information (DCI).

5. The apparatus of claim 1, wherein the at least one processor is further configured to cause the apparatus to apply at least one of the one or more first configuration parameters or the one or more second configuration parameters based on activation or release of the at least one of the one or more SPS occasions or the one or more CG occasions.

6. The apparatus of claim 1, wherein the at least one processor is further configured to cause the apparatus to receive, from the base station, an indication to apply the one or more first configuration parameters and the one or more second configuration parameters, wherein the indication corresponds to activation or release of at least one of the one or more SPS occasions or the one or more CG occasions.

7. The apparatus of claim 6, wherein to receive the indication, the at least one processor is configured to cause the apparatus to receive the indication via at least one of radio resource control (RRC) signaling or downlink control information (DCI).

8. The apparatus of claim 1, wherein the at least one processor is further configured to cause the apparatus to:
receive, from the base station, a second signal of a change to at least one of one or more third configuration parameters for the FD mode or one or more fourth configuration parameters for the HD mode, the one or more third configuration parameters or the one or more fourth configuration parameters being associated with at least one of one or more SPS occasions or one or more CG occasions; and
communicate with the base station via at least one of the one or more SPS occasions or the one or more CG occasions based on at least one of the one or more third configuration parameters or the one or more fourth configuration parameters.

9. The apparatus of claim 8, wherein to receive the second signal, the at least one processor is configured to cause the apparatus to receive the second signal via at least one of radio resource control (RRC) signaling or downlink control information (DCI).

10. The apparatus of claim 8, wherein the second signal includes a time window to communicate with the base station based on the at least one of the one or more third configuration parameters or the one or more fourth configuration parameters.

11. The apparatus of claim 8, wherein the second signal includes a bitmap indicating the at least one of the one or more SPS occasions or the one or more CG occasions to apply the at least one of the one or more third configuration parameters or the one or more fourth configuration parameters in communicating with the base station.

12. The apparatus of claim 8, wherein the one or more third configuration parameters or the one or more fourth configuration parameters are applied for retransmissions of the one or more SPS occasions or the one or more CG occasions based on per occasion repetition of the one or more SPS occasions or the one or more CG occasions.

13. The apparatus of claim 8, wherein the second signal includes a configurable parameter indicating at least one frequency offset between a downlink transmission and an uplink transmission for FD mode.

14. A method of wireless communication at a user equipment (UE), comprising:
receiving, from a base station, a first signal of one or more first configuration parameters for a full duplex (FD) mode and one or more second configuration parameters for a half duplex (HD) mode, the one or more first configuration parameters and the one or more second configuration parameters being associated with at least one of one or more semi-persistent scheduling (SPS) occasions or one or more configured grant (CG) occasions; and
communicating, with the base station via at least one of the one or more SPS occasions or the one or more CG occasions based on at least one of the one or more first configuration parameters or the one or more second configuration parameters.

15. The method of claim 14, further comprising:
receiving, from the base station, a second signal of a change to at least one of one or more third configuration parameters for the FD mode or one or more fourth configuration parameters for the HD mode, the one or more third configuration parameters and the one or more fourth configuration parameters being associated with at least one of one or more SPS occasions or one or more CG occasions; and
communicating, with the base station via at least one of the one or more SPS occasions or the one or more CG occasions based on at least one of the one or more third configuration parameters or the one or more fourth configuration parameters.

16. An apparatus for wireless communication at a base station, comprising:
memory; and
at least one processor coupled to the memory and configured to cause the apparatus to:
determine one or more first configuration parameters for a full duplex (FD) mode and one or more second configuration parameters for a half duplex (HD) mode, the one or more first configuration parameters and the one or more second configuration parameters being associated with at least one of one or more semi-persistent scheduling (SPS) occasions or one or more configured grant (CG) occasions;
transmit, to at least one user equipment (UE), a first signal of the one or more first configuration parameters and the one or more second configuration parameters; and
communicate with the at least one UE via at least one of the one or more SPS occasions or the one or more CG occasions based on at least one of the one or more first configuration parameters or the one or more second configuration parameters.

17. The apparatus of claim 16, wherein the one or more first configuration parameters are associated with a first subset of one or more SPS configurations or one or more SPS occasions within an SRS configuration or associated with a first subset of one or more CG configurations or one or more CG occasions within a CG configuration, and the one or more second configuration parameters are associated with a second subset of one or more SPS configurations or one or more SPS occasions within an SRS configuration or associated with a second subset of one or more CG configurations or one or more CG occasions within a CG configuration.

18. The apparatus of claim 16, wherein the one or more first configuration parameters include at least one of: at least one downlink (DL) and uplink (UL) beam pair for FD mode, one or more power control parameters, a transmission (Tx) power, or a modulation and coding scheme (MCS), and the one or more second configuration parameters include at least one of: at least one DL or UL beam for HD mode, one or more power control parameters, a Tx power, or an MCS.

19. The apparatus of claim 16, wherein to transmit the first signal, the at least one processor is configured to cause the apparatus to transmit the first signal via at least one of radio resource control (RRC) signaling or downlink control information (DCI).

20. The apparatus of claim 16, wherein the at least one processor is further configured to cause the apparatus to apply at least one of the one or more first configuration parameters or the one or more second configuration parameters based on activation or release of the at least one of the one or more SPS occasions or the one or more CG occasions.

21. The apparatus of claim 16, wherein the at least one processor is further configured to cause the apparatus to transmit, to the at least one UE, an indication to apply the one or more first configuration parameters and the one or more second configuration parameters, wherein the indication corresponds to activation or release of at least one of the one or more SPS occasions or the one or more CG occasions.

22. The apparatus of claim 21, wherein to transmit the indication, the at least one processor is configured to cause the apparatus to transmit the indication via at least one of radio resource control (RRC) signaling or downlink control information (DCI).

23. The apparatus of claim 16, wherein the at least one processor is further configured to cause the apparatus to:
transmit, to the at least one UE, a second signal of a change to at least one of one or more third configuration parameters for the FD mode and one or more fourth configuration parameters for the HD mode, the one or more third configuration parameters and the one or more fourth configuration parameters being associated with at least one of one or more SPS occasions or one or more CG occasions; and
communicate, with the at least one UE via at least one of the one or more SPS occasions or the one or more CG occasions based on at least one of the one or more third configuration parameters or the one or more fourth configuration parameters.

24. The apparatus of claim 23, wherein to transmit the second signal, the at least one processor is configured to cause the apparatus to transmit the second signal via at least one of radio resource control (RRC) signaling or downlink control information (DCI).

25. The apparatus of claim 23, wherein the second signal includes a time window to communicate with the at least one UE based on the at least one of the one or more third configuration parameters or the one or more fourth configuration parameters.

26. The apparatus of claim 23, wherein the second signal includes a bitmap indicating the at least one of the one or more SPS occasions or the one or more CG occasions to apply the at least one of the one or more third configuration parameters or the one or more fourth configuration parameters in communicating with the at least one UE.

27. The apparatus of claim 23, wherein the one or more third configuration parameters or the one or more fourth configuration parameters are applied for retransmissions of the one or more SPS occasions or the one or more CG occasions based on per occasion repetition of the one or more SPS occasions or the one or more CG occasions.

28. The apparatus of claim 23, wherein the second signal includes a configurable parameter indicating at least one frequency offset between a downlink transmission and an uplink transmission for FD mode.

29. A method of wireless communication at a base station, comprising:
determining one or more first configuration parameters for a full duplex (FD) mode and one or more second configuration parameters for a half duplex (HD) mode, the one or more first configuration parameters and the one or more second configuration parameters being associated with at least one of one or more semi-persistent scheduling (SPS) occasions or one or more configured grant (CG) occasions;
transmitting, to at least one user equipment (UE), a first signal of the one or more first configuration parameters and the one or more second configuration parameters; and
communicating, with the at least one UE via at least one of the one or more SPS occasions or the one or more CG occasions based on at least one of the one or more first configuration parameters or the one or more second configuration parameters.

30. The method of claim 29, further comprising:
transmitting, to the at least one UE, a second signal of a change to at least one of one or more third configuration parameters for the FD mode or one or more fourth configuration parameters for the HD mode, the one or more third configuration parameters and the one or more fourth configuration parameters being associated with at least one of one or more SPS occasions or one or more CG occasions; and
communicating, with the at least one UE via at least one of the one or more SPS occasions or the one or more CG occasions based on at least one of the one or more third configuration parameters or the one or more fourth configuration parameters.

* * * * *